United States Patent
Mori et al.

(10) Patent No.: US 6,433,882 B1
(45) Date of Patent: Aug. 13, 2002

(54) DEVICE FOR PROCESSING INTERMEDIATE FILES IN PRINTER CONTROL SYSTEM

(75) Inventors: Hiromi Mori; Masatoshi Kadota, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/240,863

(22) Filed: Feb. 1, 1999

(30) Foreign Application Priority Data

Jan. 30, 1998 (JP) ............................. 10-033842

(51) Int. Cl.⁷ .................. G06F 13/00; G06F 3/12; G06K 15/02
(52) U.S. Cl. .................... 358/1.13; 358/1.9; 358/524; 358/1.17; 358/2.1
(58) Field of Search .................. 358/1.15, 1.16, 358/1.9, 1.13, 1.17, 2.1, 524

(56) References Cited

U.S. PATENT DOCUMENTS 5,699,492 A  * 12/1997 Karaki ..................... 395/109
5,845,058 A  * 12/1998 Shaw et al. ............... 395/114

OTHER PUBLICATIONS

Text Printed Out from a CD–ROM entitled "Microsoft Developer Network (1997)".

* cited by examiner

Primary Examiner—Joseph Mancuso
Assistant Examiner—Douglas Tran
(74) Attorney, Agent, or Firm—Oliff & Berridge, PLC

(57) ABSTRACT

An application 11, a printer driver 12, and a Graphical Device Interface 13 cooperate to prepare Enhanced Meta Files for each print job. The Enhanced Meta Files do not depend on the type of device. The Enhanced Meta Files are then stored as a spool file 18. The page separation unit 22 recognizes the print job of the spool file 18, and separates the Enhanced Meta Files for the respective pages from one another. The job preparation unit 27 prepares a new print job by processing the separated Enhanced Meta Files based on commands for processing the separated Enhanced Meta Files. According to these operations, a new print job comprised of the processed Enhanced Meta Files does not depend on the device. The personal computer can thus control special types of printing using simple processes.

33 Claims, 13 Drawing Sheets

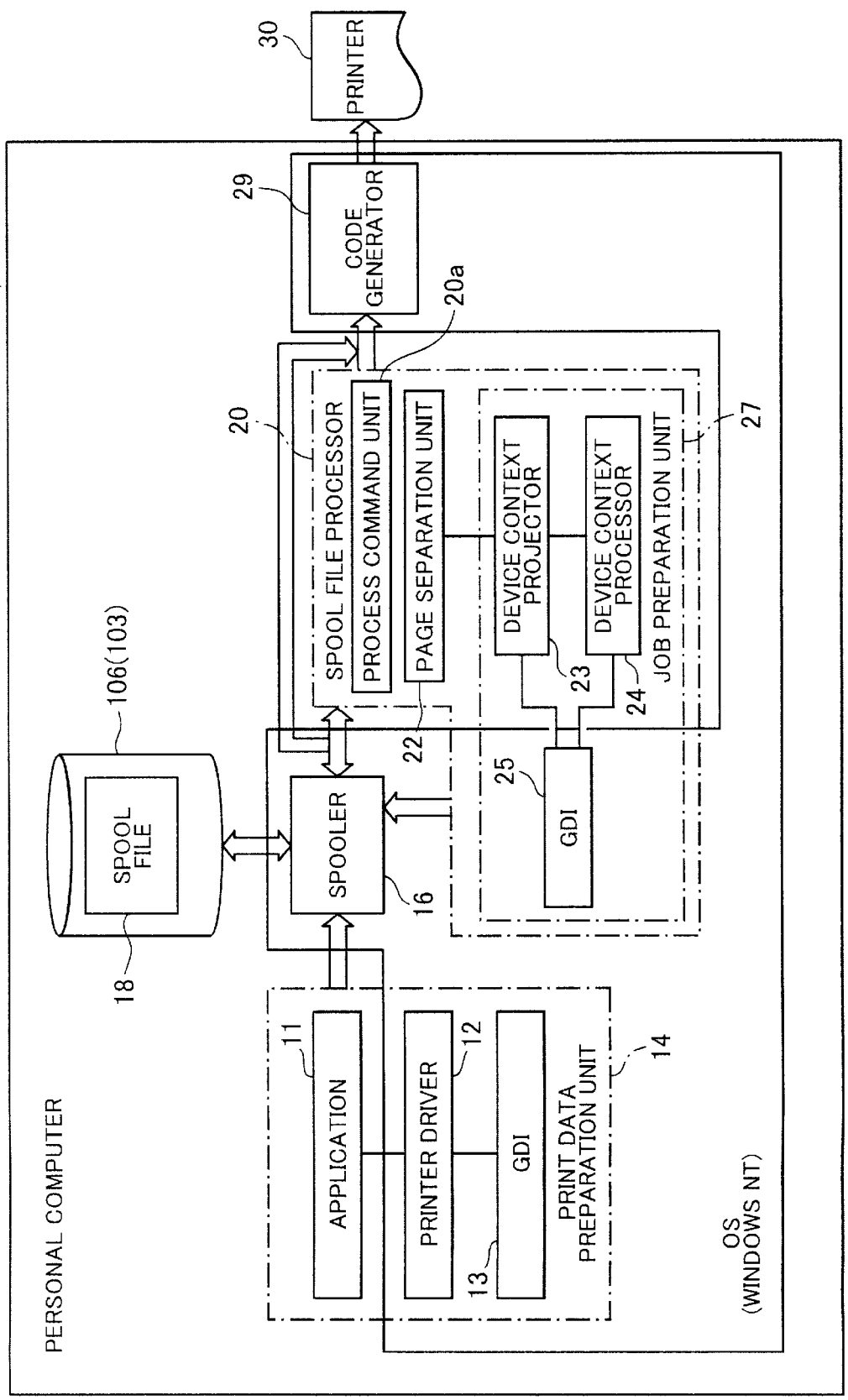

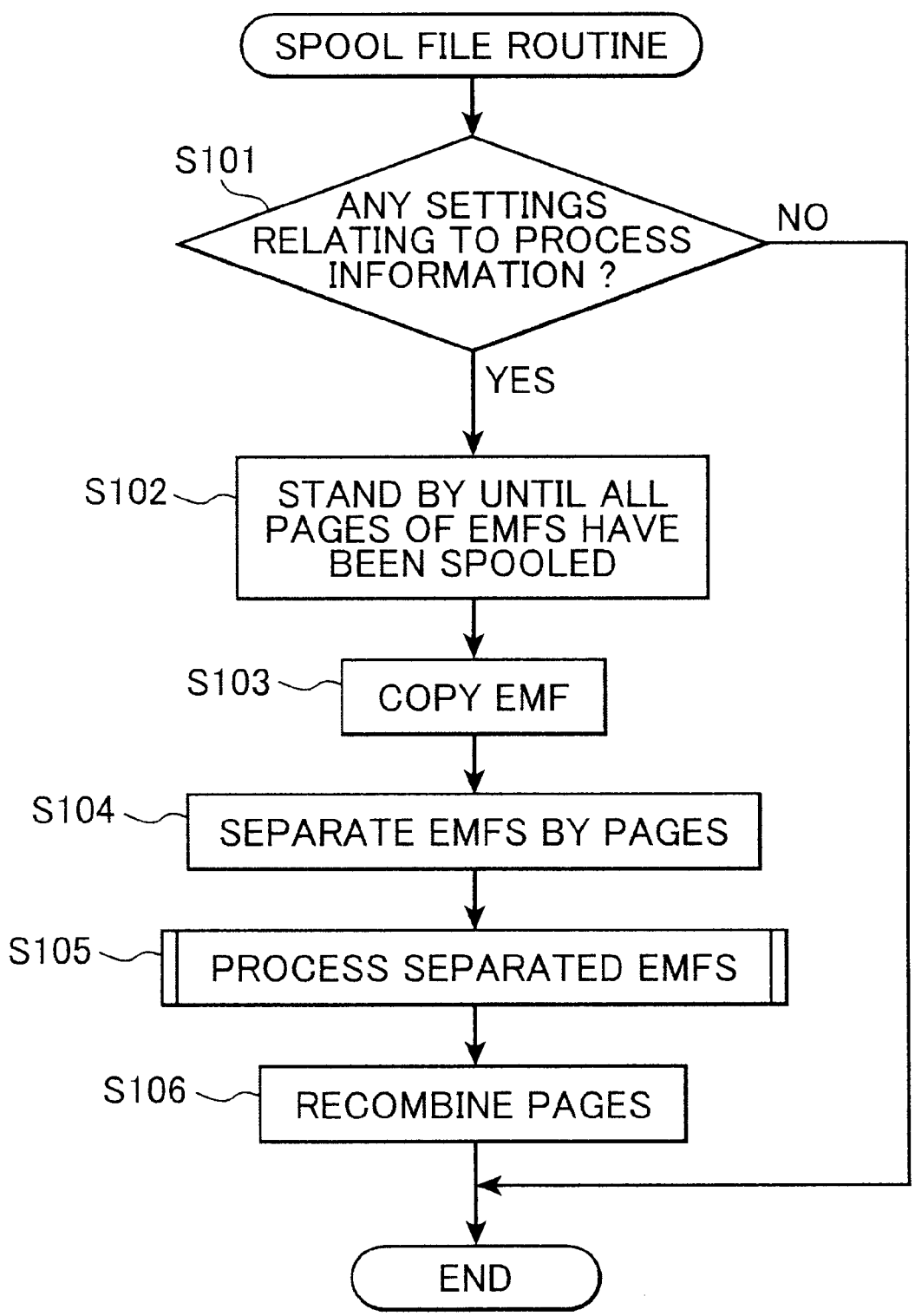

DEVICE FOR PROCESSING INTERMEDIATE FILES IN PRINTER CONTROL SYSTEM

BACKGROUND OF THE INVENTION

1. Field of the Invention

The present invention relates to an intermediate file processing device used in a printer control system that uses a printer driver of a computer to convert print data, which is prepared by an application of the computer, into print data appropriate for the printer and that then provides the print data to the printer.

2, Description of Related Art

Generally, a personal computer performs printer control operation according to an operation system OS installed therein.

FIG. 1 illustrates how a conventional personal computer 9 performs a printer control operation onto a printer 8 according to "Windows 95" (trade mark), which is one example of the operating system OS.

Based on the function of the operating system OS, a print data preparation unit 4, a code generator 5, and a spooler 6 are provided in the personal computer 9. The print data preparation unit 4 is configured from: a printer driver 2 and a Graphical Device Interface (GDI) 3, both of which are provided by the operating system OS; and an application 1 which is installed in the personal computer 9 separately from the operating system OS.

With this structure, when a user prepares print data using the application 1, the printer driver 2 controls the Graphical Device Interface (GDI) 3 according to the print data. The GDI 3 is a program module provided by the operating system "Windows 95 (trade mark)" and is a "Windows (trade mark)" standard for representing graphical objects. The GDI 3 prepares a device context (DC) which is a virtual display region or virtual device. Based on the received print data, the GDI 3 draws an image on the device context by storing print data, that is independent of the type of device (printer, display, or the like), at coordinates of the device context indicated by the application 11. When the image is thus drawn on the device context (virtual device), an intermediate file, termed an Enhanced Meta File (EMF), is automatically produced due to the function of the printer driver 2 and the GDI 3. The EMF is formed from various commands, such as a command to "draw a line" and a command to "form a polygon."

The print data preparation unit 4 then sends the thus produced Enhanced Meta File to the code generator 5, which in turn converts the Enhanced Meta File into control commands of a description language corresponding to the type of the printer 8. Each control command is made from a train of control codes.

It is noted that each printer manufacturer uses his/her own printer control commands with different specifications. For example, Hewlett Packard uses command sets of a page description language "PCL (Printer Control Language)." Adobe uses command sets of a page description language "PostScript". In order to cope with all these various description languages, the code generator 5 converts the Enhanced Meta File into control commands of the description language corresponding to the target printer 8.

The code generator 5 outputs the control commands, each of which is formed from a train of control codes, to the spooler 6, which in turn stores the control commands as a spool file 7 in a hard disk provided to the personal computer.

The spooler 6 then retrieves the control commands from the spool file 7, and transmits the control commands to the printer 8 so that the printer 8 will perform printing operation.

SUMMARY OF THE INVENTION

The personal computer 9 can be used to control the printer 8 to perform special types of printing jobs, such as multi-pages printing, overlap printing, and page-exchange printing. When the user inputs a command to perform a special print job during the application process, the code generator 5 inserts, among control codes, a special command necessary for performing the special print job when outputting the control codes to the spooler 6. In this case, the code generator 5 has to generate a special control code for the special print job in the description language corresponding to the model of the target printer. Because each different printer model uses a different description language, a special control code for each special print job has to be prestored in the personal computer 9 in the description language of each different printer model. Accordingly, for each special print operation, a plurality of different special control codes have to be prestored in the personal computer 9 in correspondence with the plurality of different description languages. The code generator 5 has to perform extremely complicated processes onto the Enhanced Meta File.

It is therefore an objective of the present invention to overcome the above-described problem and to provide an improved printer control system that enables the personal computer to control special print jobs using simple processes independent of the printer model.

In order to attain the above and other objects, the present invention provides an intermediate file processing device, comprising: a memory: intermediate file forming means for receiving a set of print data for a print job to be printed by a printer, for forming, for the print job, a set of one or more intermediate file, independent of a device for treating the print job, based on the set of print data, and for storing the set of one or more intermediate file in the memory, each intermediate file representing a single page image to be printed by the printer onto a single sheet; process command means capable of producing a command for processing the print job; page separation means for, in response to the command, recognizing the set of one or more intermediate file for the print job and for separating the one or more intermediate file from one another; and job processing means for processing the print job through producing, according to the command, a set of one or more new intermediate file based on the set of one or more intermediate file. The memory may be constructed from a hard disk. The memory may be constructed from a RAM.

The intermediate file processing device may further comprise code generating means for converting the set of one or more new intermediate file into code data appropriate for a type of the printer.

The intermediate file processing device may further comprise print data preparation means for preparing the print data for each print job, the print data preparation means preparing a command file indicative of whether the print job should be processed and storing the command file into the memory, wherein the process command means analyzes the command file stored in the memory, and outputs the command based on the analyzed result.

According to another aspect, the present invention provides an intermediate file processing device for a printer control system that uses a printer driver of a computer to convert, for a print job, print data, which is prepared by an application of the computer, into code data appropriate for the printer and that then provides the code data to the printer, the intermediate file processing device comprising: a memory; intermediate file forming means for receiving a set of print data for a print job to be printed by a printer, for forming a set of one or more intermediate file, independent of a device for treating the print job, for the print job based on the set of print data, and for storing the set of one or more intermediate file in the memory, each intermediate file representing a single page image to be printed by the printer onto a single sheet; process command means capable of producing a command for processing the print job; page separation means for, in response to the command, recognizing the set of one or more intermediate file for the print job and for separating the one or more intermediate file from one another; and job processing means for processing the print job through producing, according to the command, a set of one or more new intermediate file based on the set of one or more intermediate file, the set of one or more new intermediate file being converted by a printer driver into code data appropriate for the printer. The memory may be constructed from a hard disk. The memory may be constructed from a RAM.

According to still another aspect, the present invention provides a printer control system, comprising: a printer and a personal computer connected to the printer, the personal computer including: a memory; print data preparation means for preparing a set of print data for each print job to be printed by the printer, for preparing a command file indicative of whether the print job should be processed, and for storing the command file into the memory; intermediate file forming means for receiving the set of print data for each print job, for forming, for the print job, a set of one or more intermediate file, independent of a device for treating the print job, based on the set of print data, and for storing the set of one or more intermediate file in the memory, each intermediate file representing a single page image to be printed by the printer onto a single sheet; process command means for analyzing the command file stored in the memory and for, based on the analyzed result, selectively producing a command for processing the corresponding print job; page separation means for, in response to the command, recognizing the set of one or more intermediate file for the corresponding print job and for separating the one or more intermediate file from one another; job processing means for processing the print job through producing, according to the command, a set of one or more new intermediate file based on the set of one or more intermediate file; and code generating means for converting the set of one or more new intermediate file into code data appropriate for a type of the printer. The memory may be constructed from a hard disk. The memory may be constructed from a RAM.

The job processing means may store the set of one or more new intermediate file in the memory as a new print job. Or, the job processing means may store the set of one or more new intermediate file in the memory as the same print job through writing the set of one or more new intermediate file onto the set of one or more original intermediate file.

According to a further aspect, the present invention provides a data recording medium storing, in a retrievable condition, a control program for controlling an intermediate file processing device for a printer control system, the control program comprising: a control program for producing a command for processing a print job; a control program for, in response to the command, recognizing a set of one or more intermediate file for the print job and for separating the one or more intermediate file from one another; and a control program for processing the print job through producing, according to the command, a set of one or more new intermediate file based on the set of one or more intermediate file.

The control program may further include a control program for receiving a set of print data for a print job to be printed by a printer, for forming, for the print job, the set of one or more intermediate file, independent of a device for treating the print job, based on the set of print data, and for storing the set of one or more intermediate file in a memory, each intermediate file representing a single page image to be printed by the printer onto a single sheet.

BRIEF DESCRIPTION OF THE DRAWINGS

The above and other objects, features and advantages of the invention will become more apparent from reading the following description of the preferred embodiment taken in connection with the accompanying drawings in which:

FIG. 2(b) is a functional block diagram schematically showing a personal computer provided in the printer control system of the first embodiment;

FIG. 16 is a flowchart representing a spool file routine executed according to the second embodiment.

DETAILED DESCRIPTION OF THE PREFERRED EMBODIMENTS

Figure 1:
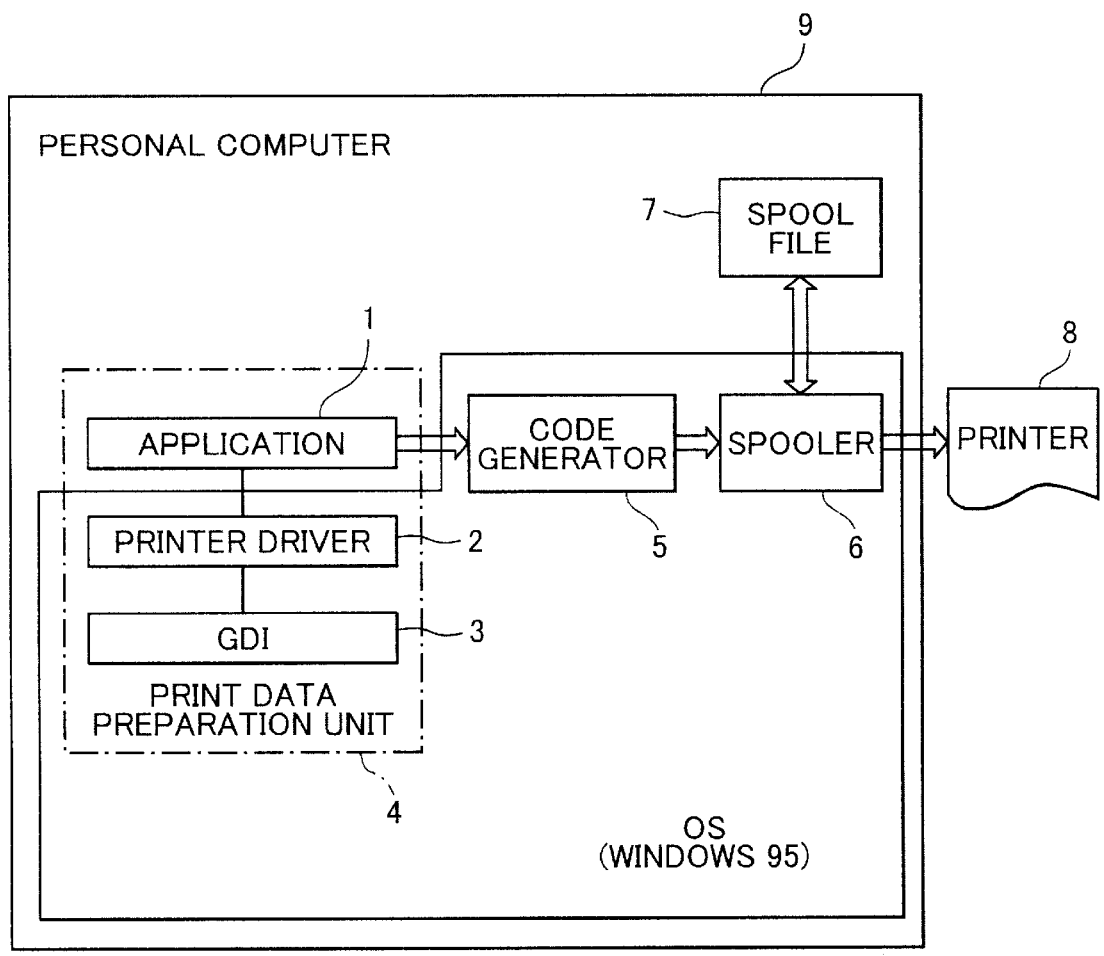
FIG. 1 is a functional block diagram schematically showing a conventional personal computer serving as a printer controller.

A printer control system according to preferred embodiments of the present invention will be described while referring to the accompanying drawings wherein like parts and components are designated by the same reference numerals to avoid duplicating description.

First Embodiment

A first embodiment of the present invention will be described below with reference to FIGS. 2(a)–14.

Figure 2A:
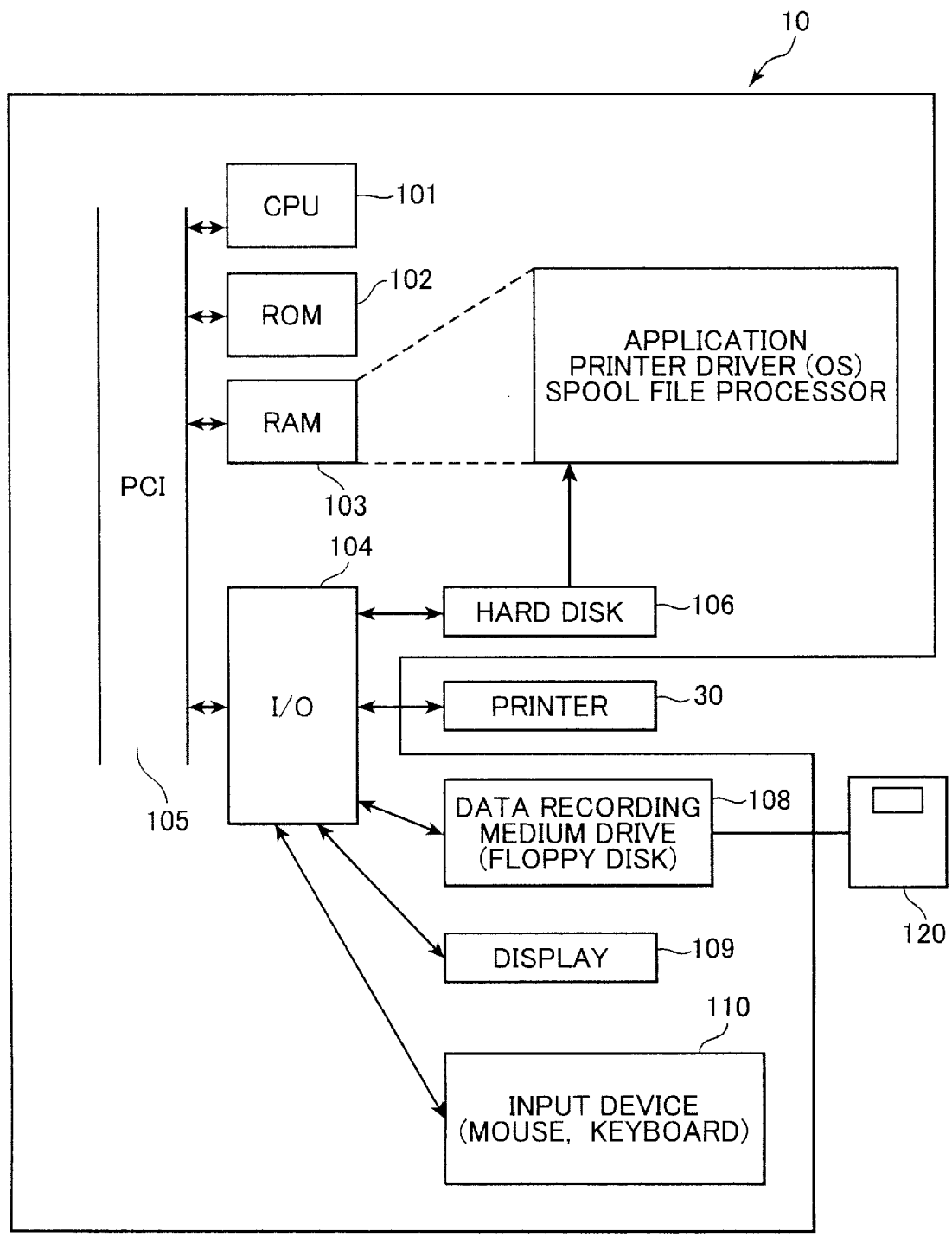
FIG. 2(a) is a block diagram showing configuration of a printer control system of a first embodiment of the present invention.

As shown in FIG. 2(a), the printer control system of the first embodiment is constructed from a personal computer 10 and a printer 30 that is connected to the personal computer 10 via a cable or the like.

The personal computer 10 includes: a CPU 101; a ROM 102; a RAM 103; and an input/output interface 104 which are interconnected with one another via a bus line (Peripheral Component Interconnect bus line) 105. The input/output interface 104 is connected to: a hard disk 106; a data recording medium drive (flexible disk drive) 108; a display 109; and an input device 110 such as a mouse and a keyboard. The input/output interface 104 is connected also to the printer 30.

The ROM 102 stores therein a BIOS. The hard disk 106 stores therein a variety of programs, such as an application program, a program of an operating system (OS), and a spool file processing program 20 shown in FIG. 4. In this example, the operating system OS is "Windows NT" (trade mark) produced by Microsoft Corporation. The operating system (OS) program includes a printer driver program (a printer driver user interface and a printer driver code generating program), a spooler program, and a pair of program modules "Graphical Device Interfaces". It is noted that when each of the programs in the hard disk 106 is to be executed by the CPU 101, data of the program is copied into the RAM 103, and then is executed by the CPU 101. The hard disk 106 also serves to store a spool file 18 (FIG. 2(b)) for each print job as will be described later.

The CPU 101 is for controlling the entire portion of the personal computer 10. The CPU 101 executes the programs stored in the ROM 102 and the programs copied into the RAM 103 from the hard disk 106.

The data recording medium drive 108 is for retrieving data of a program and the like from a data recording medium 120, such as a floppy disk or flexible disk, which is mounted to the data recording medium drive 108. For example, the spool file processing program of FIG. 4 may be initially stored in a data recording medium such as a flexible disk 120. When a user of the personal computer 10 desires to install the spool file processing program into the personal computer 10, the user operates the personal computer 10 to copy data of the spool file processing program from the flexible disk 120 into the hard disk 106.

The display 109 is for displaying a variety of messages. The display 109 is also for displaying print data which the CPU 101 prepares through executing the application program such as a word processing program. The input device 110, such as a mouse and a keyboard, is for enabling the user to input his/her desired settings to the computer 10. For example, the user manipulates the input device 110 to prepare print data (document) while the CPU 101 executes the application program. When the user desires to set a special printing job to his/her prepared document, the user inputs his/her instruction to set the special type printing onto the document through manipulating the input device 110. Representative examples of the special printing job include: a multi-page printing, an overlap printing, and a page order changing printing.

With using the above-described structure, a printer control system is provided by the personal computer 10 as shown in FIG. 2(b).

As shown in FIG. 2(b), the printer control system is comprised of: a print data generation unit 14; a spooler 16; a spool file processing unit 20; and a code generator 29.

The print data generating unit 14 is for producing, for a single job, one or more intermediate files and a command file representing control data necessary for printing the subject print job. The one or more intermediate files are called "Enhanced Meta Files" (EMFs), and each intermediate file (EMF) represents a single page's worth of image to be printed. As shown in FIG. 2(b), the print data generation unit 14 is constructed from an application 11, a printer driver 12, and a Graphical Device Interface (GDI) 13. The application 11 is provided by the application program. The printer driver 12 is provided by the printer driver user interface included in the operating system (OS) program. The Graphical Device Interface 13 is provided by the Graphical Device Interface program module included also in the operating system (OS) program.

The spooler 16 is for combining all the intermediate files (all the pages' worth of EMFs) for the single print job into a single spool file (data file) 18, and for storing the spool file 18 in the hard disk 106. The spooler 16 is also for storing the command file for the print job into the hard disk 106. The spooler 16 is provided by the spooler program included in the operating system (OS) program.

The spool file processor 20 is actuated when the spooler 16 starts executing a spool process on a print job. The spool file processor 20 produces, for the subject print job, a new print job based on: all the intermediate files (all the pages' worth of EMFs) presently stored as the spool file 18; and the process information included in the command file. More specifically, the spool file processor 20 produces one or more new intermediate files (new EMFs) based on the original intermediate files (EMFs) and the contents of the process information.

The spool file processor 20 is constructed from: a process command unit 20a, a page separation unit 22, a device context projector 23, a device context processor 24, and a Graphical Device Interface (GDI) 25. The process command unit 20a, the page separation unit 22, the device context projector 23, and the device context processor 24 are provided by the spool file processing program. The GDI 25 is provided by the Graphical Device Interface program module included in the operation system (OS).

The code generator 29 is for producing, based on the new print job (new EMFs), a successive series of control codes in correspondence with the type of the printer 30. When receiving the successive series of control codes, the printer 30 will print images based on the new EMFs. The code generator 29 is provided by the printer driver code generator program included in the operating system (OS) program.

Figure 14:
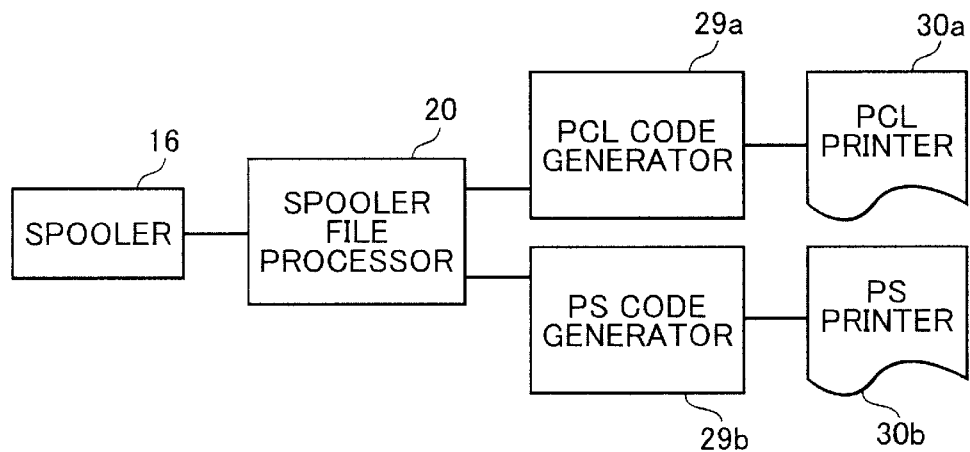
FIG. 14 is a functional block diagram showing the case where two different printers are connected to the personal computer.

Although not shown in the drawing, the operating system (OS) program includes a plurality of different printer driver code generating programs corresponding to a plurality of printers that use different description languages. For example, the operating system (OS) program includes: a printer driver code generating program corresponding to a PCL printer; and a printer driver code generating program corresponding to a PostScript printer. When some type of printer 30 is designated for each print job by the user during the application, the code generator 29 is established according to a corresponding printer driver code generating program. That is, as shown in FIG. 14, when a PCL printer 30 (30a) is designated by the user for some print job, a PCL code generator 29. (29a) is established according to the corresponding printer driver code generating program. When a PostScript printer 30 (30b) is designated for some print job, a PostScript code generator 29 (29b) is established according to the corresponding printer driver code generating program.

It is noted that the printer driver user interface that provides the printer driver 12 and the printer driver code generating program that provides the code generator 29 are generally called collectively "printer driver".

The print data preparation unit 14 will be described below in greater detail.

The application 11 is for preparing print data (document data), for a single print job, according to a user's instruction inputted to the input device 110. The application 11 transfers the print data to the printer driver 12, which in turn controls the Graphical Device Interface (GDI) 13 according to the print data.

As described above, the GDI 13 is a program module is provided by the operating system ("Windows NT (trade mark)" in this case). The GDI 13 is a Windows (trade mark) standard for representing graphical objects through managing a device context (DC) and for preparing one or more Enhanced Meta Files for a single print job.

It is noted that there are generally two types of Graphical Device Interface: a first type that performs management of device contexts and that prepares Enhanced Meta Files; and a second type that converts Enhanced Meta Files for a device context into commands dependent on a particular type of device (i.e., printer or display). Each of the GDIs 13 and 25 according to the present embodiment is of the first type that is provided by the operation system (OS). The second type is provided as a driver by a device manufacturer.

The GDI 13 serves to prepare a device context (DC) which is a virtual display region or virtual device. The GDI 13 also serves to draw an image on the device context (virtual display) by storing print data, independent from a type of device (printer, display, and the like), at coordinates on the device context indicated by the application 11.

More specifically, when a user controls the personal computer 10 to prepare a document according to the application 11, data of the document is written on a device context for the display 109. As a result, the document image is displayed on the display 109. More specifically, the device context is written with data indicating: character font, coordinates, and characters constituting the document. When the user designates to print the document on the application 11, the printer driver 12 controls the GDI 13 to prepare another device context for printer, and to perform the same operation as described above for the device context for display. Thus, the device context is written with the same data (print data) that indicates: character font, coordinates, and constituent characters.

When a document image is thus drawn on the device context (virtual device), an intermediate file (EMF), which is independent of the type of a target device, is prepared for a corresponding page. Thus, one or more EMFs are prepared for the single print job according to the total number of pages of the document prepared by the application 11.

The printer driver 12 is also for producing a command file in response to the user's instruction inputted to the input device 110.

The spooler 16 is for coupling all the intermediate files (EMFs) of the single print job together to create a single spool file (data file) 18, and for storing the spool file 18 in the hard disk 106. Thus, the GDI 13 and the spooler 16 cooperate to prepare one or more intermediate files for a single print job. The spooler 16 also serves to receive the command file for the subject print job from the print data preparation unit 14 and to store the command file into the hard disk 106. Thus, both the spool file 18 and the command file are prepared and filed in the hard disk 106 for a single job. It is noted that the command file and the spool file 18 for the same print job have the same file name indicating a job ID for the subject print job. Whether or not the file is the command file or the spool file 18 can be distinguished by an extension of the file name.

It is noted that the spool file 18 and the command file need not be stored in the hard disk 106. The spool file 18 and the command file could instead be stored in the RAM 103. That is, the spool file 18 and the command file can be formed as data accessible in the memory 103. In other words, the spool file 18 need only be under management of the personal computer 10.

Figure 3:
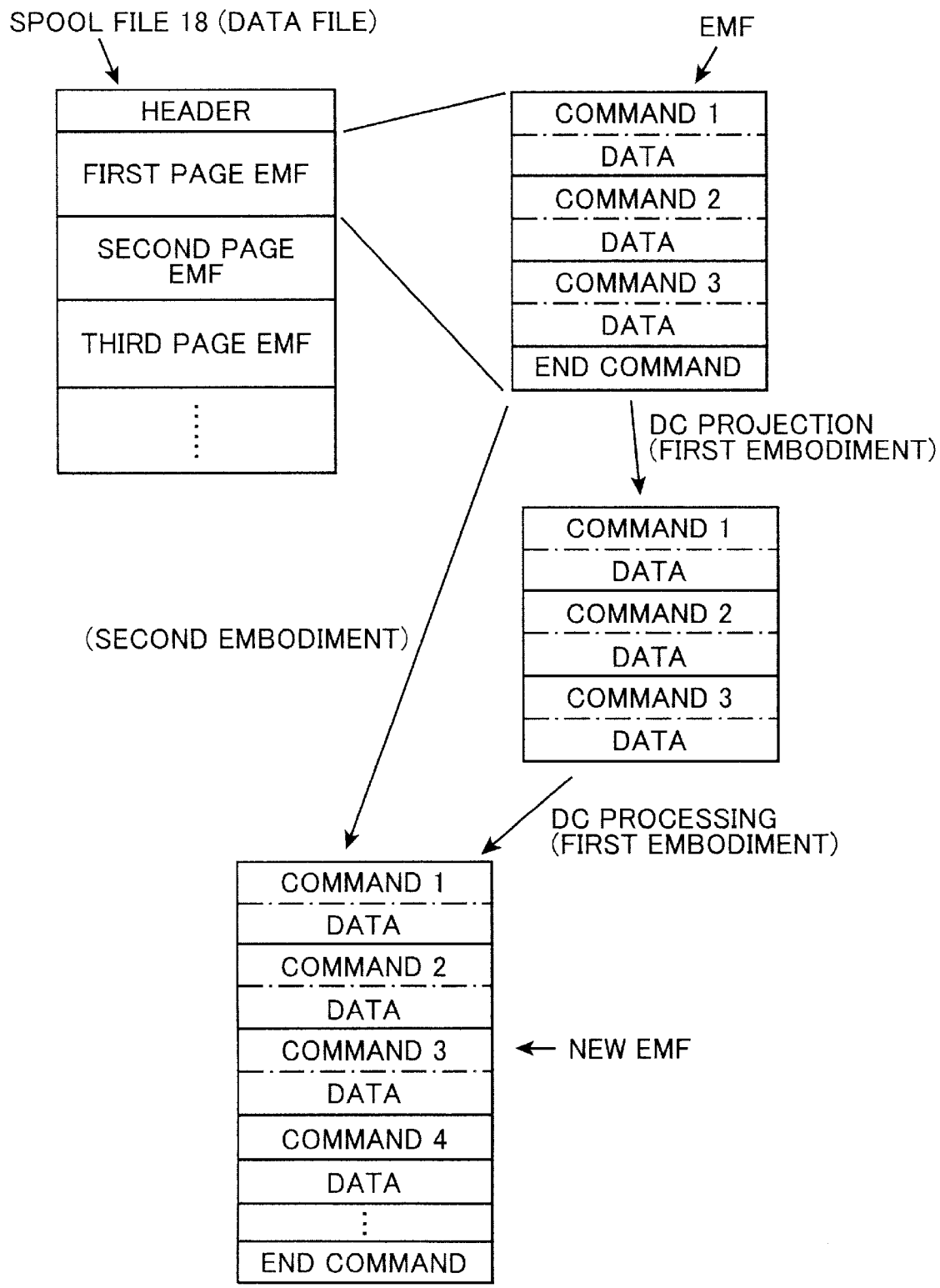
FIG. 3 is a schematic view showing configuration of a spool file and each Enhanced Meta File, and schematically showing how a new Enhanced Meta File is prepared through processes performed on the Enhanced Meta File according to the first embodiment and a second embodiment.

As shown in FIG. 3, the spool file (data file) 18 thus prepared for a single job is configured from one or more EMFs, each EMF being for printing a corresponding page image. Each EMF includes: two or more commands such as a command to "draw a line" and a command to "form a polygon" and data necessary for performing operations indicated by the corresponding command. In the example of FIG. 3, an EMF for a first page includes: first command 1 (header command) and data for performing operations indicated by first command 1; second command 2 and data for performing operations indicated by second command 2; third command 3 and data for performing operations indicated by third command 3; and an "END" command. If the second command 2 is a command to "draw a line", for example, the data for the second command 2 includes: data of a coordinate of a start point of the line; data of a coordinate of an end point of the line; and data of a thickness of the line.

Although not shown in the drawing, the command file includes control data necessary for printing the spool file 18 of the same print job. More specifically, the command file includes: (1) control data, necessary for performing printing operation, such as a size of a sheet to be printed and a direction in which the sheet is to be inserted into the printer 30; (2) information such as an output port, through which the subject print job is to be outputted, and name of a printer driver for selecting a code generator 29 appropriate for the type of the printer 30 and (3) management information, such as name of the subject print job, to be used for displaying a printing proceeding condition and the like.

The application 11 enables the user to manipulate the input device 110 to instruct that the subject print job should be subjected to some special printing operation, such as multi-page printing, overlap printing, or page-order exchange printing. In this case, the command file is prepared by the printer driver 12 to further include, as control data (1), process information indicating that the subject print job should be subjected to the user's designated special type of printing. When the user designates the multi-page printing, for example, the process information includes page layout information. More specifically, when the user designates a "2-in-1" printing to print two successive pages into a single sheet, the process information includes page layout information on the "2-in-1" printing and on whether images of the subject job are of a portrait type or of a landscape type as will be described later. When the user designates the overlap printing, the process information includes information on one or more characters to be printed as overlapped with images of the subject job and on which page the characters should be printed in the overlap condition. When the user designates the duplex printing as the page-order exchange printing, for example, the process information includes information on how the order of pages should be exchanged to attain the user's desired duplex printing operation.

The spool file processing unit 20 will be described below in greater detail.

The spool file processing unit 20 is for judging whether the command file of each print job includes the process information for some special type of printing. When some print job includes the process information, the spool file processing unit 20 starts up the spool file processing operation after the spooler 16 completely stores the spool file 18 for the subject print job. The spool file processor 20 processes the Enhanced Meta Files for the subject print job, in order to enable the user's designated special types of printing.

More specifically, the process command unit 20*a* is for analyzing whether the command file of each print job is set with process information relating to any special type of printing. When the process information is included in the command file for some print job, the process command unit 20*a* outputs a command to process the Enhanced Meta Files of the subject print job.

The page separation unit 22 is for confirming the file names of the spool files 18, which are stored in the hard disk 106, to identify the subject print job that is determined by the process command unit 20*a* to include the process information. The page separation unit 22 then copies the EMFs in a single spool file 18 of the identified print job into a temporary file that is prepared in the RAM 103 or another memory such as the hard disk 106. Thus, when the temporary file is prepared in the RAM 103, the temporary file is constructed as data accessible in the memory 103. It is noted that the temporary file will be erased once it is no longer needed.

Then, the page separation unit 22 divides the temporary file by page units. In other words, the page separation unit 22 separates, from one another, the respective EMFs included in the single temporary file for the subject print job. More specifically, the page separation unit 22 searches the "END" commands included in the EMFs as shown in FIG. 3, and separates the EMFs for the respective pages from one another.

The device context projector 23, the device context processor 24, and the GDI 25 configure a job preparation unit 27 for preparing a new print job (new EMFs) based on: the original print job (original EMFs) that is originally prepared by the GDI 13 and the spooler 16 and that is represented by the spool file 18 (temporary file): and the process information included in the corresponding command file.

More specifically, the device context projector 23 is for outputting an image projecting command to the Graphical Device Interface (GDI) 25. The image projecting command is added with: information identifying a device context to be used; information designating a memory region where a new file (new EMF) resulting from setting of print data on the device context is to be stored; and information indicating a region on the device context where an image is to be drawn. The image projecting command indicates that the GDI 25 should project each EMF copy onto the device context, indicated by the device context identifying information, thereby setting print data of each EMF on the device context.

Upon receipt of the image projecting command, the GDI 25 performs image projecting processes to project or draw, on the designated device context, an image represented by each EMF copy. In other words, the GDI 25 sets, on the device context, print data for drawing an image represented by each EMF copy.

It is assumed that the command file for the print spool 18 shown in FIG. 3 includes process information for some special printing. In this case, when the Enhanced Meta File for the first page is projected by the DC projector 23 onto the device context, a corresponding image is drawn on the device context. As a result, a new intermediate file (EMF) is prepared to have the same structure as the original intermediate file (EMF) for the first page, but is not yet appended with the "END" code. This is because the process for the Enhanced Meta File for the first page is not yet completed. That is, as shown in FIG. 3, the new Enhanced Meta File is prepared to have command 1 and data for command 1, command 2 and data for command 2, and command 3 and data for command 3.

The device context processor 24 is for outputting a processing command to the Graphical Device Interface (GDI) 25. The processing command is for indicating that the GDI 25 should perform processes on the new Enhanced Meta File that is formed on the device context by the device context projector 23 as described above. Upon receipt of the processing command, the GDI 25 first retrieves the process information from the command file for the subject EMF copy. The process information has been analyzed by the process command unit 20*a*. The process information contains information on how processes should be performed on the EMF copy. The GDI 25 then processes the image presently projected on the device context based on the process information. As a result, due to the function of the GDI 25 a newly-processed intermediate file (EMF) is automatically produced.

For example, as shown in FIG. 3, the thus newly-processed EMF is added with several successive sets of control commands and corresponding data that achieve the designated special type of printing. In other words, the several sets of control commands and corresponding data are written into the region where the Enhanced Meta File, newly prepared by the device context projector 23, is being stored. In this example, command 4 and data for the command 4, and so on are added subsequent to the data for the command 3. When the processes are completed, a closing process (end process) is performed to add an "END" command to the new EMF, thereby completing the new EMF and giving the now first page EMF a new configuration as shown in FIG. 3. When new EMFs are thus produced for all pages, the new EMFs are returned to the spooler 16. The spooler 16 couples all the new EMFs as a new print job and stores the new EMFs as a spool file 18 for the new print job.

It is assumed that the process information indicates that an overlap printing should be performed to print overlap characters "CONFIDENTIAL" in an overlap condition with all the pages of the subject print job. In this case, the GDI 25 is instructed by the DC projector 23 to retrieve each page's worth of EMF from the temporary file and to project the retrieved EMF image on the device context. Then, the GDI 25 is instructed by the DC processor 24 to designate: a size of each overlap character: a font of each overlap character; and a position, at which each overlap character is to be located. The GDI 25 is then instructed by the DC processor 24 to write the overlap character train "CONFIDENTIAL" on the device context. As a result, an EMF is newly produced to represent the above-described processes. The newly-produced EMF includes, in addition to the commands and data included in the original EMF, a successive sets of commands and data to draw the character train "CONFIDENTIAL."

When the process information indicates that the page-order changing operation should be performed, the order, in which the EMFs for the respective pages are projected on the device context, is changed from the normal order that is defined from the first page down to the last page. As a result, a new set of EMFs is prepared in which EMFs for the respective pages are arranged in the projected order. For example, when a face up printing is designated in the process information, a new set of EMFs is prepared so that EMFs are arranged in a reversed order from the last page up to the first page. Each EMF is added with a command and data for indicating that the corresponding page should be printed in the order in which the subject EMF is located in the new set of EMFs.

When the process information indicates that the multi-page printing should be performed, the EMF for each page is projected on the device context at a properly-converted size, position, and orientation. As a result, a new set of EMFs is prepared.

Thus, according to the present embodiment, the intermediate files (EMFs), per se, are not processed, but the device context is subjected to the desired processes. As a result, the new intermediate files (EMFs) are automatically and easily produced according to the operation of the GDI 25

It is noted that after the page separation unit 22 copies the original EMFs of the subject print job for the special processing, the job preparation unit 27 starts up the spooler 16 to delete the original spool file 18, thereby deleting the subject print job.

Further, because the EMFs of the new print job are returned to the spooler 16, it becomes unnecessary to immediately forward the new print job to the code generator 29 and to control the printer 30 to perform printing. Therefore, it becomes possible to freely select when to process EMFs and to perform printing operation.

The code generator 29 is for receiving the EMFs for the new print job, which are prepared by the spool file processor 20 and which are returned to the spooler 16. The code generator 29 converts the EMFs for the new print job into control codes in description language that corresponds to the type of the printer 30. The code generator 29 transmits the control codes to the printer 30. It is noted that when any special type of printing is not designated for some print job, the print job is not processed by the spool file processor 20. Accordingly, the original EMFs are transmitted to the code generator 29 and are converted into code data by the code generator 29.

Processes performed by the spool file processor 20 will be described below in greater detail with reference to FIG. 4.

Figure 4:
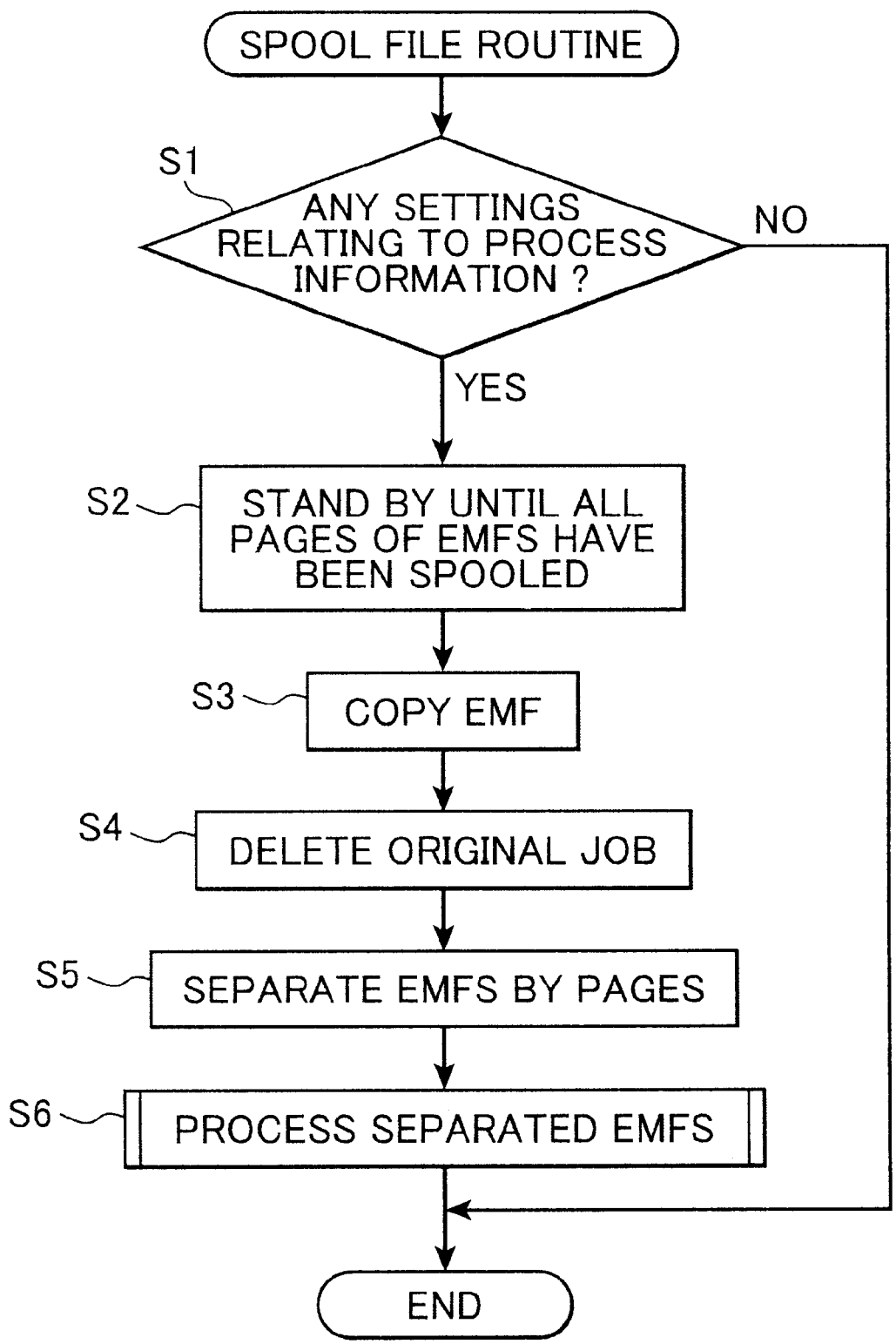
FIG. 4 is a flowchart representing a spool file routine executed according to the first embodiment.

It is noted that the hard disk 106 of the personal computer 10 stores the control program of FIG. 4 for controlling the spool file processor 20. When necessary, the control program is transferred from the hard disk 106 to the RAM 103, and is then started up.

First, in S1, the process command unit 20a analyses a command file for a print job newly prepared by the print data preparation unit 14. Based on this analysis, it is determined whether or not the command file for the newly-produced print job have any process information. If no process information is found (S1:NO), then it is unnecessary to process the EMFs for the subject print job, so this routine is ended. In this case, the original EMFs will be transmitted to the code generator 29 and will be converted to code data.

On the other hand. if process information is found (S1:YES), then in S2, a standby condition is entered until the spooler 16 completely spools out EMFs for the new print job as a spool file 18. During the standby condition, it is repeatedly checked whether or not spooling is being performed.

Once EMFs for all the pages are spooled out, then in S3, the page separation unit 22 identifies the subject print job that is being presently in the spool file 18. Then, the EMFs for all the pages of the subject print job are copied from the spool file 18 into a temporary file. Then, in S4, the original EMFs are deleted from the spool file 18, thereby clearing the original print job.

Then, in S5, the page separation unit 22 separates the copied EMFs for the respective pages from one another. Next in S6, the separated EMFs are processed based on the determination in S1 as to how the special type of printing is designated to be performed. The thus processed EMFs are stored by the spooler 16 into the hard disk 106 as a new spool file 18 for a new print job. A new command file is also stored in the hard disk 106 for the new print job. The new command file includes no process information relating to the special type printing. Then, this routine is ended. The thus produced new print job will then be subjected to the processes of FIG. 4 by the spool file processor 20. Because the command file for the new print job includes no process information (no in S1 ), the new print job will directly be sent to the code generator 29.

The processes in S6 will be explained in greater detail for each of the representative examples of the special printing operations.

First, explanation will be provided for when multi-page printing is designated.

Figure 5:
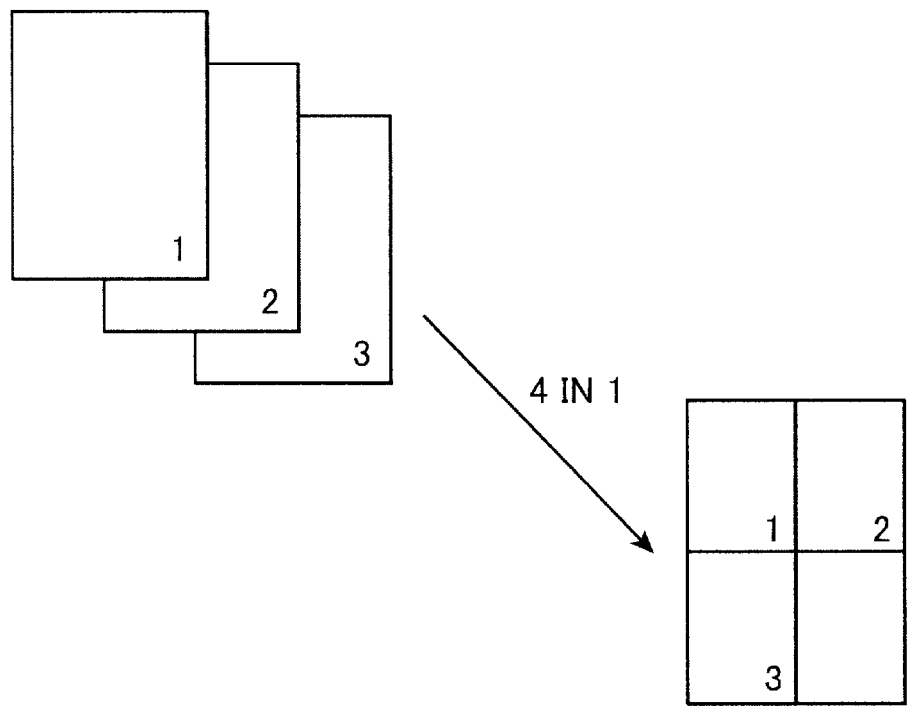
FIG. 5 is a schematic view showing how a 4-in-1 printing, one example of multi-page printing, is executed.
Figure 6A:
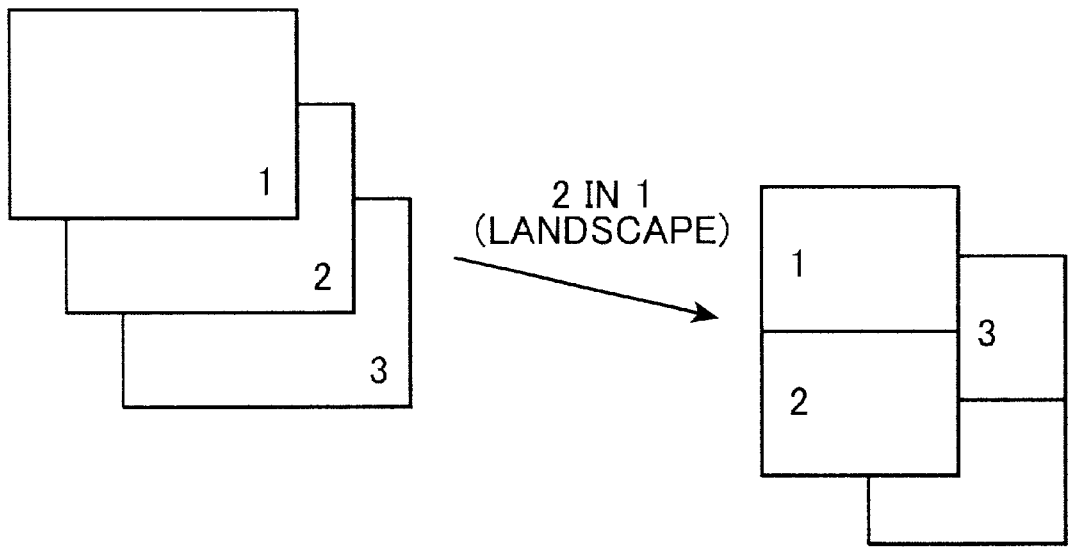
FIG. 6(a) is a schematic view showing how a landscape type 2-in-1 printing, another example of multi-page printing, is executed.
Figure 6B:
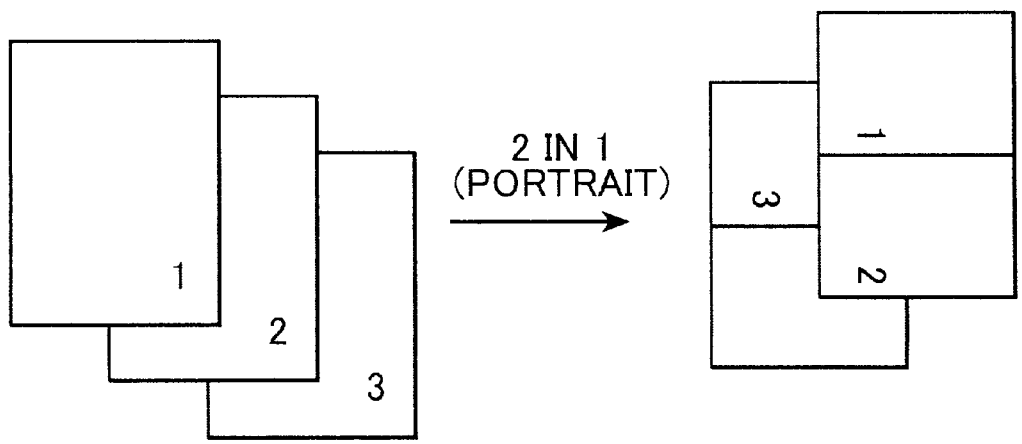
FIG. 6(b) is a schematic view showing how a portrait type 2-in-1 printing, still another example of multi-page printing, is executed.

During the multi-page printing, a plurality of successive pages are printed on the same sheet. For this reason, multi-page printing is termed "N-in-1" printing where N indicates the number of successive pages to be printed on the single sheet. FIG. 5 shows a "4-in-1" printing where four successive pages are printed in the same sheet. FIG. 6(a) shows a "2-in-1" printing to be performed onto images of a landscape type, wherein two successive pages of landscape type are printed in the same sheet. FIG. 6(b) shows another "2-in-1" printing to be performed onto images of a portrait type, wherein two successive pages of portrait type are printed in the same sheet.

Figure 7:
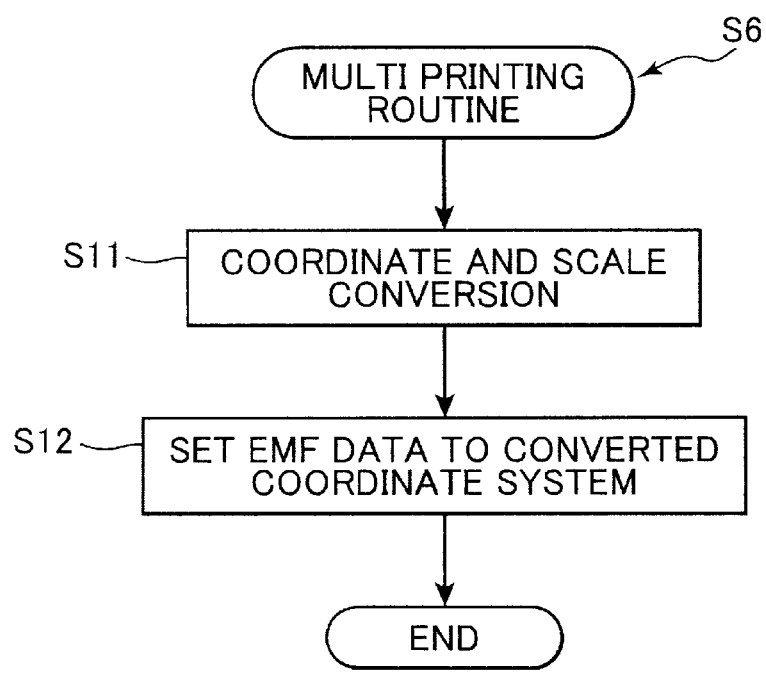
FIG. 7 is a flowchart representing an EMF processing process of S6 in FIG. 4 for the multi-page printing.

FIG. 7 shows a flowchart representing the process routine of S6 executed when process information on the multi-page printing is included in the command file for the subject print job.

In this routine, a coordinate and scale conversion processes is first executed in S11 on the device context as required for the "N-in-1" printing. Next in S12, an image of an EMF for each page is projected onto the device context at the converted coordinate system. In other words, print data of EMF for each page is set on the device context according to the converted coordinate system.

The coordinate conversion process of S11 will be described below in greater detail for the "4-in-1" and "2-in-1" printing as concrete examples of the "N-in-1" printing.

Figure 8:
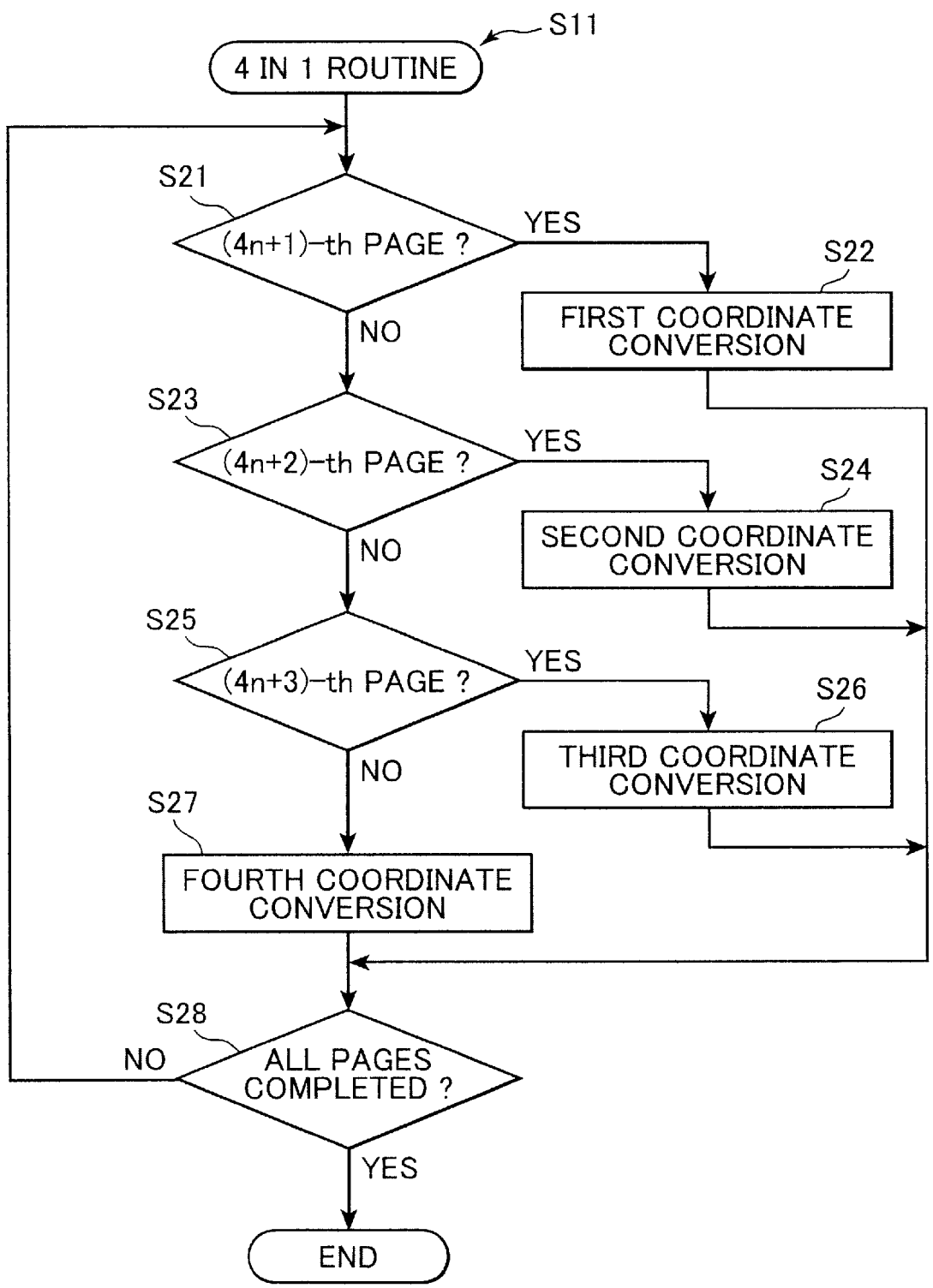
FIG. 8 is a flowchart representing a conversion process of S11 in FIG. 7 for 4-in-1 printing.

Processes of S11 are performed for 4-in-1 multi-page printing as shown in FIG. 8.

It is noted that as shown in FIG. 5, images for each set of four successive pages ("4n+1"-th through "4n+4"-th pages) are printed on the same m-th printing sheet, wherein m and n are integers and m=n+1. That is, as shown in FIG. 5, each m-th printing sheet is divided into four sections: an upper left section, an upper right section, a lower left section, and a lower right section. An image for each page is reduced in size and is printed on a corresponding section.

In the process of S11, it is first judged in S21 whether or not an EMF subjected to be processed is for the (4n+1)-th page, that is, for a first page of a group of four successive pages to be printed on a single m-th sheet. If so (S21:YES), then in S22, a first coordinate conversion is performed to set print data from the EMF of the subject (4n+1)-th page to the upper left side of the m-th sheet. The coordinate conversion performed in S22 is performed based on the following formulas:

$$X' = aX + bY + c$$
$$Y' = dX + eY + f$$

wherein coefficients "a", "b", "d", and "s" define rotation and scale conversion, and coefficients "c" and "f" define parallel movement.

The coordinate conversion is a function of the operation system (OS).

If S21 results in a negative determination (S21:NO), then in S23, it is judged whether or not the present EMF is for a (4n+2)-th page, that is, for a second page in the group of four successive pages to be printed on the m-th sheet. If so (S23;YES), then in S24, a second coordinate conversion is performed to set print data of the EMF for the (4n+2)-page to the upper right portion of the m-th sheet.

On the other hand, if S23 results in a negative determination (S23:NO), then in S25, it is judged whether or not the present EMF to be processed is for the (4n+3)-th page. If yes (S25;YES), then in S26, a third coordinate conversion is performed to set print data of the (4n+3)-th page to the lower right half of the m-th sheet.

When S25 results in a negative determination (S25:NO), then a fourth coordinate conversion is performed in S27. The fourth coordinate conversion is performed to set print data of the EMF of the (4n+4)-th page to the lower right half of the m-th page.

After some of the processes of S22, S24, S26, and S27 are performed, then the program proceeds to S28 wherein it is judged whether or not all the pages of the present print job have been subjected to coordinate conversion. If not (528:NO), then the program returns to S21. If all the pages have been completed (S28:YES), then this routine is ended.

Figure 9:
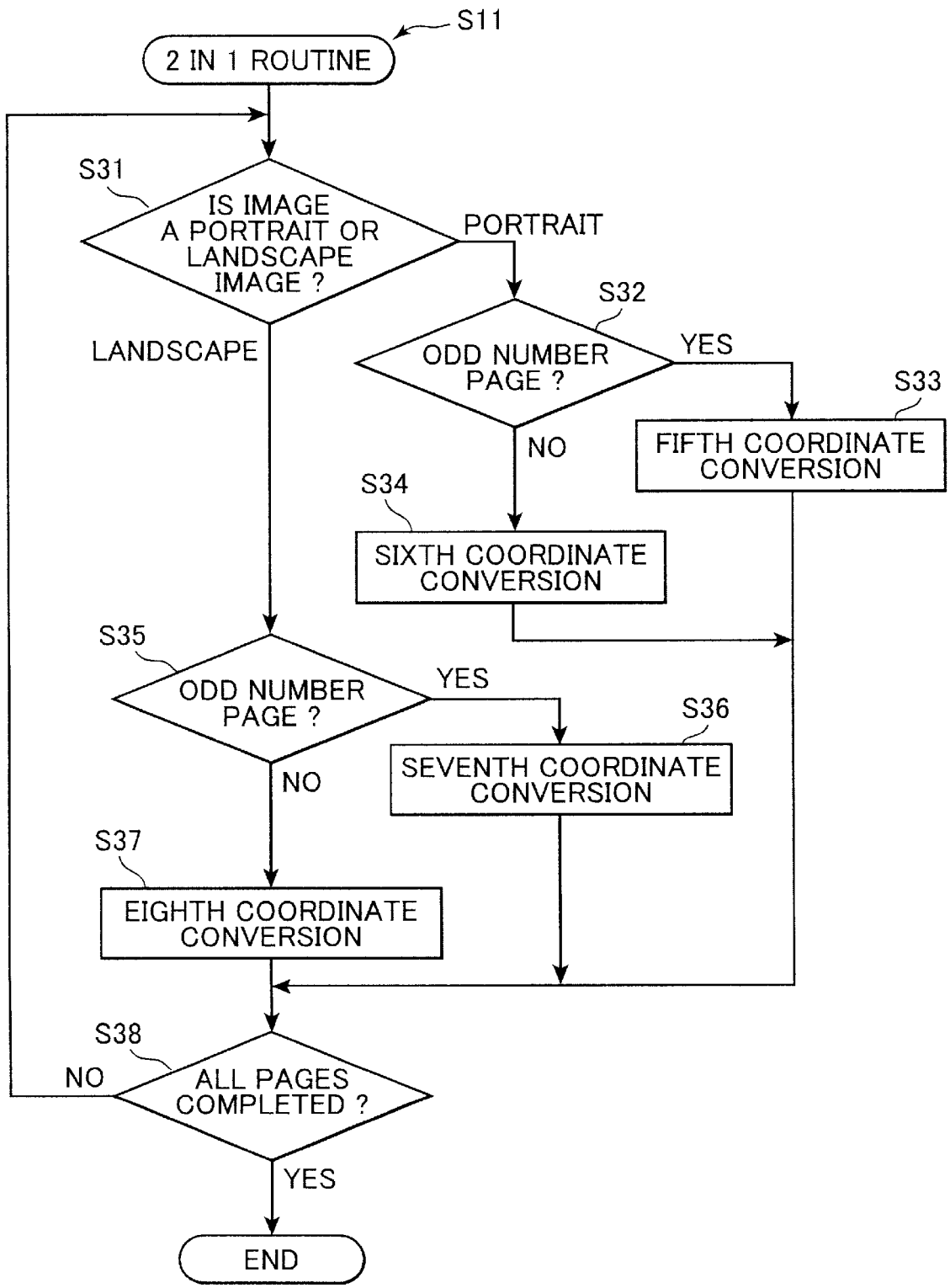
FIG. 9 is a flowchart representing the conversion process of S11 in FIG. 7 for 2-in-1 printing.

Processes of S11 are performed for 2-in-1 multi-page printing as shown in FIG. 9.

It is noted that during the 2-in-1 printing, images for each set of two successive pages are printed on the same printing sheet. Each printing sheet is divided into two sections: an upper section and a lower section. As shown in FIG. 6($a$), when the EMF for each page represents a landscape image, which has a longest side in the horizontal direction, the landscape image of each page should be reduced in size and located on a corresponding section. As shown in FIG. 6($b$), when the EMF for each page represents a portrait image, which has a longest side in the vertical direction, the portrait image of each page should be reduced in size, rotated in its orientation by 90 degrees, and located in a corresponding section.

During the process of S11, it is first judged in S31 whether or not the image of the subject EMF is a portrait image or a landscape image. If the image is a portrait image, then in S32, it is judged whether or not the subject EMF is for an odd number page. If the subject EMF is for an odd number page (S32:YES), then in S33 a fifth coordinate conversion is performed to set print data for the odd number page EMF onto the upper half section of the printing sheet. If the subject EMF is for an even number page (S32:NO), then a sixth coordinate conversion is performed, in S34, to set print data for the even number page EMF onto the lower half of the printing sheet.

On the other hand, when it is determined in S31 that the subject EMF is for a landscape image, then in S35, it is judged whether or not the subject EMF is for an odd numbered page. If so (S35:YES), then a seventh coordinate conversion is performed, in S36, to set print data for the odd number page EMF onto the upper half of a printing sheet. If the subject EMF is for even number page (S35:NO), then in S37, an eighth coordinate conversion is performed to set print data for the even number page EMF onto the lower half of the printing sheet.

After the processes in any of S33, S34, S36, and S37 are completed, the program proceeds to S38, wherein it is judged whether or not coordinate conversion has been performed for all the pages. If not (S35:NO), then the program returns to S31. If coordinate conversion has been performed for all the pages (S38:YES), then this routine is ended.

The processes of S6 (FIG. 4) are executed as described below when the command file includes process information for overlap printing.

Figure 10:
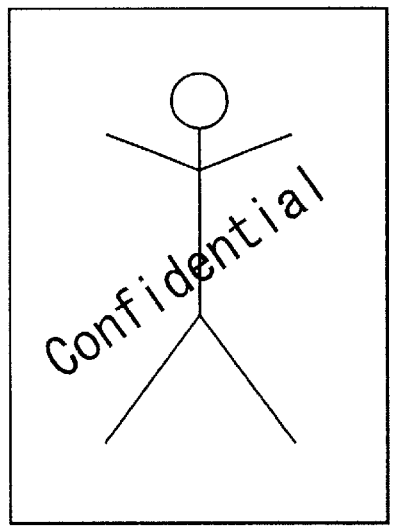
FIG. 10 is a schematic view showing how overlap printing is executed.

It is now assumed that the process information designates that an image of a person, represented by an EMF for some page in the subject print job, be printed as overlapped with semitransparent characters reading "CONFIDENTIAL" as shown in FIG. 10.

Figure 11:
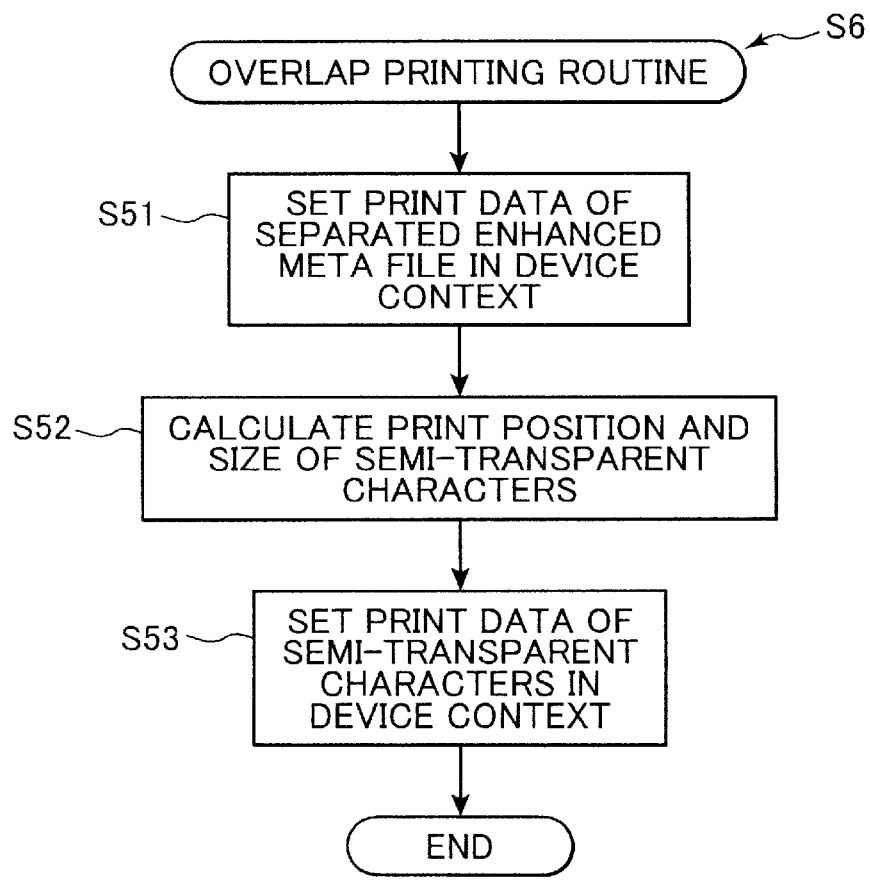
FIG. 11 is a flowchart representing the EMF processing process of S6 in FIG. 4 for the overlap printing.

The processing routine of S6 is executed as shown in FIG. 11 for the overlap printing.

First, in S51, print data of an EMF for the subject page is set in the device context. Then in S52, the print position and size of the semitransparent characters "CONFIDENTIAL" are calculated based on: the size of a print sheet to be printed, the number of the semitransparent characters, and a print angle of the semitransparent characters with respect to the print sheet. Then in S53. print data of the semitransparent characters, calculated in S52, is set in overlapping form on the device context where the print data of the Enhanced Meta File is already being set in S51. Then, this routine is ended.

It is noted that if the process information indicates that all the pages should be subjected to the overlap printing all the pages are processed in the same manner as described above, and then the present routine is ended.

It is noted that the processes performed in S51 to S53 could be performed in an opposite order, that is, in the order of S53, S52, and S51, so that the semitransparent characters will be printed first and then the original image be printed on top of the semitransparent characters.

The processing routine of S6 (FIG. 4) is executed as described below when the command file includes process information on the page-exchange printing.

Figure 12:
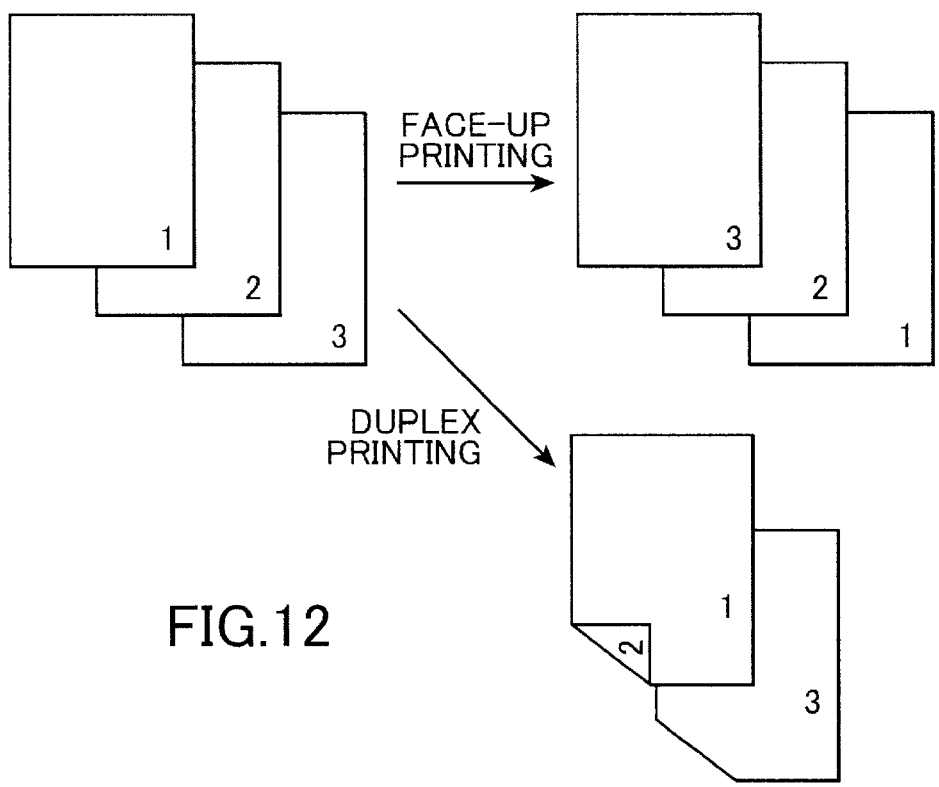
FIG. 12 is a schematic view showing how page-exchange printing is executed.

It is noted that during page-exchange printing, the order of printing a plurality of pages in the subject job can be changed. For example, in order to perform face-up printing, as shown in FIG. 12, the order of printing the plurality of pages is reversed so that the plurality of pages will be printed from the last page up to the first page. In order to perform duplex printing, the order of printing the plurality of pages is adjusted so that different pages will be printed on both sides of each sheet.

Figure 13:
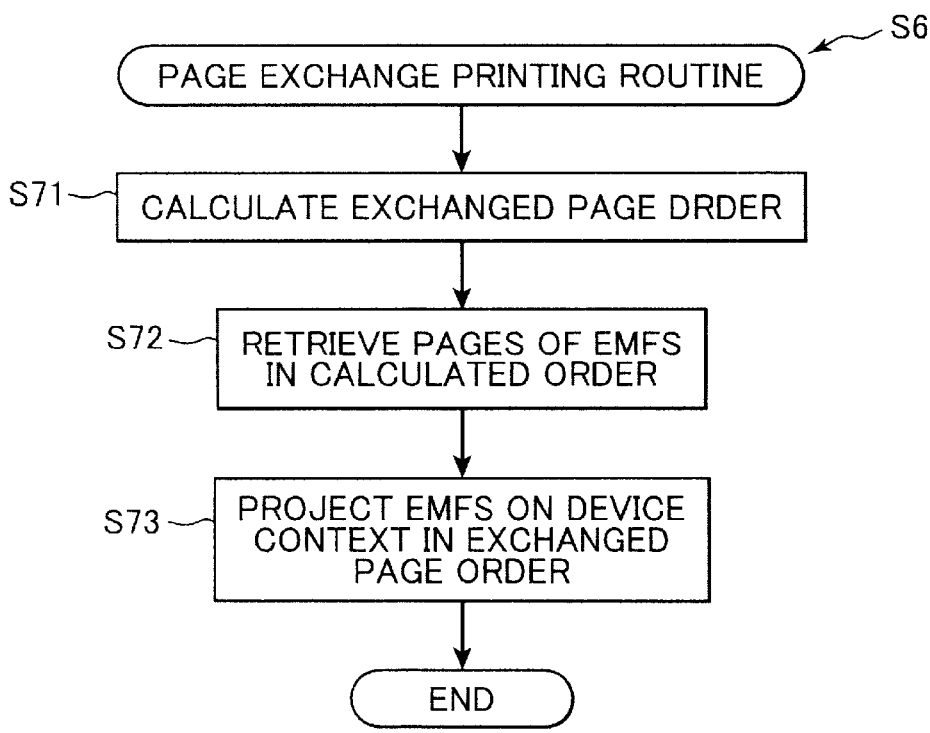
FIG. 13 is a flowchart representing the EMF processing process of S6 in FIG. 4 for the page-exchange printing routine.

FIG. 13 is a flowchart representing the processing routine of S6 when the command file includes the process information for the page-exchange printing routine.

First in S71, the order of printing pages is calculated. When the command file includes the process information for the face up printing, the order of printing pages is calculated as an inverse order with respect to the pages for a total number of "n". That is, the order of printing images is calculated as the order of "n", "n-1", "n-2", ... "2", and "1". When the command file includes the process information for duplex printing, the order of printing images is calculated so that all the odd number pages will be printed first in a normal order, that is, from the first page down to the maximum odd number page, and then all the even number pages be printed in an inverse order, that is, from the maximum even number page up to the second page.

Next in S72, the EMFs for all the pages of the subject print job are retrieved in the order calculated in S71. Next, in 573, the retrieved EMFs are successively projected on the device context in the order, in which the EMFs are retrieved. When the print data for each page (EMF) is set to the device context, a new EMF is produced for the corresponding page. The thus successively produced new EMFs are constructed from the original EMFs arranged in the order exchanged in S71. Then, the page-exchange processing routine of S6 is ended.

Thus, according to the processes of S6 for the page-exchange printing, the order of drawing the respective pages worth of EMF images onto the device context is exchanged according to the user's designation of the page-exchanging printing. As a result, a new set of EMFs is prepared from the plurality of pages in the exchanged order.

It is noted that especially when the command file includes process information for a manual duplex printing, all the odd number pages will be printed first on separate sheets. In this case, the odd number pages will be printed from the first page down to the maximum odd number page according to the face up printing process. As a result, on a discharge tray (not shown) of the printer 30, the maximum odd number page will be positioned on the top of the stack. Then, the user turns over the stack of the printed sheets, and reinserts it into the printer 30. Then, the even number pages will printed on the unprinted sides of the sheets in an inverse order from the maximum even number page up to the second page. As a result, a second page's worth of image will be printed on a side opposite to the side where the first page's worth of image is printed. It is noted that when the total number of pages is odd, the side opposite to the maximum odd number page will be blank. The user can fix the thus obtained stack of printed pages at its left side, thereby obtaining a book-shaped stack.

For the above-described manual duplex printing, it is preferable that the single print job, designated for the manual duplex printing operation, be divided into a first print job for odd number pages and a second print job for even number pages. In this case, the manual operations performed by the operator to turn over the sheets and to return them to the printer 30 can be inserted in between the first and second print jobs. The second print job will be properly executed to print even number pages on the rear surfaces of sheets printed with odd number pages.

As described above, according to the present embodiment, the page separation unit 22 of the spool file processor 20 identifies a print job, that is designated for the special type of printing, and separates EMFs of the subject print job for the respective pages from one another. Then, the job preparation unit 27 performs the processing routine of S6 on the separated EMFs to prepare a new print job. During the processing routine of S6, the device context projector 23 outputs a command to the Graphical Device Interface 25 to project an image of the separated each page's worth of EMF onto the device context. In response to the instruction, the GDI 25 projects the image of each page's EMF onto the device context. In other words, the GDI 25 sets print data of each page's worth of EMF onto the device context. Then, the device context processor 24 outputs a command to the GDI 25 to instruct that the GDI 25 should process the EMF that is being newly formed by the device context projector 23. In response to this instruction, the GDI 25 processes the image presently projected on the device context. As a result, a new EMF is automatically prepared by functions of the GDI 25. Thus, a new print job is automatically prepared by functions of the GDI 25.

The EMFs in the new print job thus newly prepared for all the pages are independent from the type of device similarly to the original EMFs. Each of the newly-produced EMFs is comprised simply from normal control codes and corresponding data as shown in FIG. 3. Accordingly, the code generator 29 can perform normal conversion processes for producing successive codes based on the newly-produced EMFs. It becomes unnecessary for the code generator 29 to prestore special control codes for the special types of printing in the form of description language that corresponds to each printer type. Without using the special control codes, the code generator 29 can easily produce control codes, based on the EMFs of the new print job, so that the control codes be defined in description language appropriately corresponding to the type of the printer 30.

FIG. 14 shows a case where the personal computer 10 is connected to two types of printers, that is, a PCL (Printer Control Language) printer 30a and a PS (PostScript) printer 30b. In this case, a PCL code generator 29a and a PS code generator 29b are provided as the code generator 29. When the user designates, in the application 11, to use the printer 30a, the corresponding code generator 29a is selected to convert the EMFs of a corresponding print job into control codes according to the description language "PCL". When the user designates, in the application 11, to use the printer 30b, the corresponding code generator 29b is selected to convert the EMFs of a corresponding print job into control codes according to the description language "PS". Even when the user designates some special type of printing in the application 11, it is sufficient that the spool file processor 20 prepare new EMFs as a new print job. The thus produced new EMFs of the new print job can be used in common to both the printers 30a and 30b. That is, each of the code generators 29a and 29b can convert the new EMFs of the new print job into control codes of a corresponding description language through the normal code conversion process. In other words, even when the special printing is designated, the same intermediate files can be used for both the PCL printer 30a and the PS printer 30b. This is contrary to the system of FIG. 1, which has to perform different special processes for the PCL printer 30a and the PS printer 30b in order to produce each special control code.

Thus, according to the present embodiment, even when the special type of printing is designated, normal code conversion processes are possible wherein the code generator 29 generates normal control codes corresponding to description language of the printer model based on the newly-prepared intermediate files of the new print job. In contrast with the situation of FIG. 1, the code generator 29 need not prestore special control codes for each special type of printing job in correspondence with description language of each printer mode. The personal computer 10 can control printing jobs for the variety of special types of printing through executing simple processes independent of the printer model.

The new print job can be automatically produced through setting print data of the separated EMFs for the respective pages on the device context and then processing the device context. Therefore, the code generator 29 can directly convert the newly-prepared print job into control codes that correspond to description language of the printer 30.

As described above, according to the present embodiment, the personal computer 10 can control the special types of printing using simple processes that do not depend on a printer model. The application 11, the printer driver 12, and the Graphical Device Interface 13 cooperate to prepare Enhanced Meta Files for a print job. The Enhanced Meta Files do not depend on the type of device. The Enhanced Meta Files are then stored as the spool file 18. The page separation unit 22 then recognizes a print job (spool file 18) to be processed, and separates the Enhanced Meta Files for the respective pages from one another. The job preparation unit 27 then prepares a now print job by processing the separated Enhanced Meta Files based on commands for processing the separated Enhanced Meta Files on the device context. The new print job, comprised of the processed Enhanced Meta Files, does not depend on the device. The personal computer 10 can thus control the special types of printing using simple processes.

In the above description, the newly-prepared print job is returned to the spooler 16. However, the newly-prepared print job can be sent directly to the code generator 29.

In the above description, the Graphical Device Interface 13 and the Graphical Device Interface 25 are configured from separate program modules. However, operations performed by both the Graphical Device Interfaces 13 and 25 can be performed by a single common program module.

Second Embodiment

Next, a second embodiment of the present invention will be described while referring to FIGS. 15 and 16.

In the first embodiment, the EMFs of the original print job are projected onto the device context. According to the designated special printing, the projected images are processed on the device context, whereupon new EMFs for a new print job are automatically produced due to the function of the GDI 25. Accordingly, a new print job with a new job ID is produced. The original job is deleted Contrarily, according to the present embodiment, no new print job is produced. A spool file 18 of the original job is merely edited and written over by a new spool file 18 that is produced according to the designated special type of printing operation. The spool file 18, that is, the EMFs of the subject job, per se, are processed according to the designated special type of printing operation. Thus, according to the present embodiment, the spool file 18 of the original print job is merely edited in the middle of the process for the print job.

Similarly to the first embodiment, the printer control system of the embodiment is constructed from the personal computer 10 that uses "Windows NT" (trade mark) as the operation system OS, and has virtually the same configuration as that of the first embodiment.

The computer 10 of the present embodiment has the same structure as shown in FIG. 2(a) except that the hard disk 106 stores therein another spool file processing program shown in FIG. 16. When the spool file processing program of FIG. 16 is executed, the program is copied to the RAM 103 from the hard disk 106. The spool file processing program may be initially stored in a data recording medium 120, such as a flexible disk, and may be copied to the hard disk 106 via the data storage medium drive 108.

Figure 15:
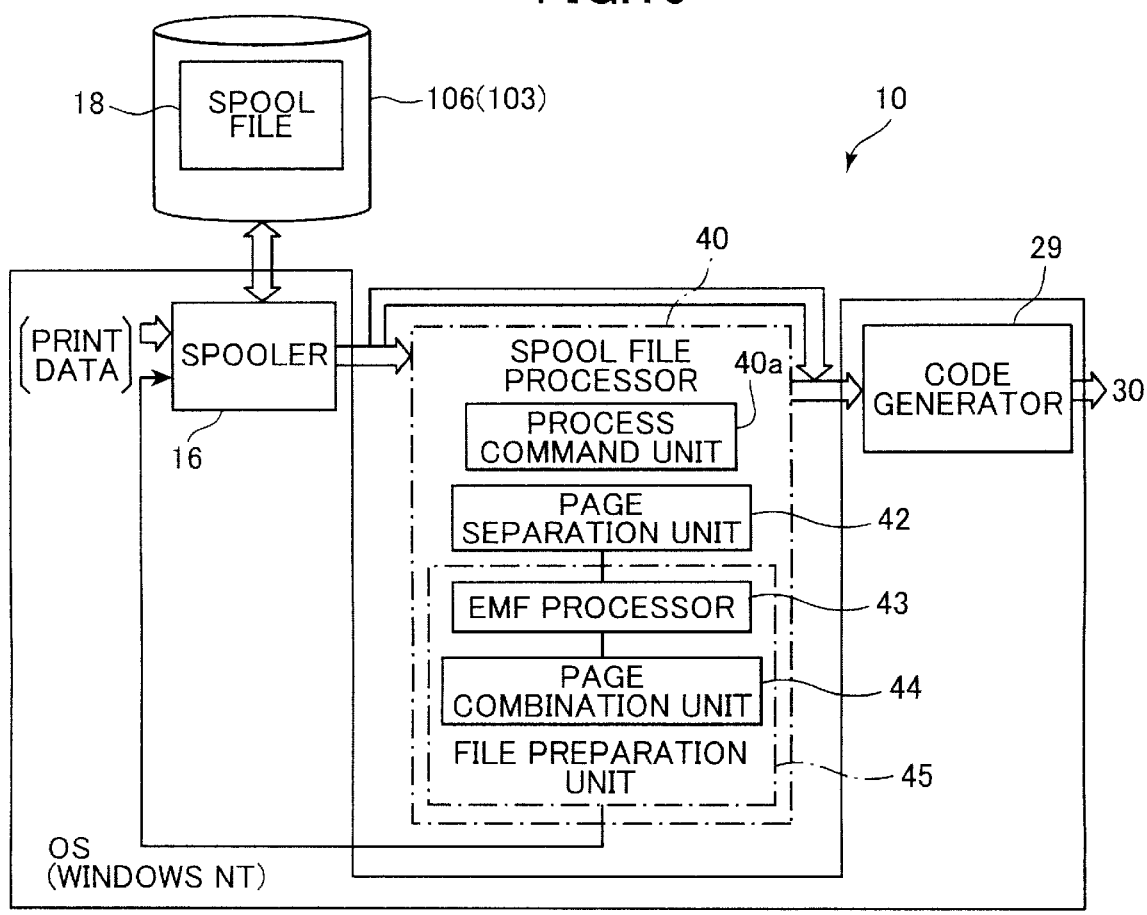
FIG. 15 is a functional block diagram schematically showing a personal computer included in a printer control system according to the second embodiment of the present invention.

With the above-described structure, the personal computer 10 can serve as a printer control system as shown in FIG. 15 through executing the variety of programs in the RAM 103 including the application program, the operating system program, and the spool file processing program of FIG. 16.

The printer control system thus realized by the computer 10 as shown in FIG. 15 is the same as that of the first embodiment except for the points described below.

It is noted that although not shown in the drawing, the print data preparation unit 14 is provided in the personal computer 10 in the same manner as in the first embodiment. That is, the print data preparation unit 14 is configured from the application 11, the printer driver 12, and the Graphical Device Interface 13. When the print data preparation unit 14 prepares, for each print job, one or more EMFs independent of the device model, the spooler 16 spools the EMFs into a spool file 18, and stores the spool file 18 within the hard disk 106 (or the RAM 103).

According to the present embodiment, in place of the spool file processor 20 of the first embodiment, a spool file processor 40 is provided for processing the EMFs, for a print job, which are stored as a spool file 18 and whose corresponding command file includes the process information for some special type of printing.

As shown in FIG. 15, the spool file processor 40 includes: a process command unit 40a, a page separation unit 42, an Enhanced Meta File processor 43, and a page combination unit 44. The process command unit 40a, the page separation unit 42, the EMF processor 43, and the page combination unit 44 are all provided by the spool file processing program shown in FIG. 16.

The EMF processor 43 and the page combination unit 44 configure a file preparation unit 45 for forming a new spool file based on the original spool file 18 and based on the contents of the process information. In the same manner as the process command unit 20a of the first embodiment, the process command unit 40a is for analyzing the command file for each print job to determine whether the command file contains process information relating to some special type of printing. The process command unit 40a outputs a command for processing the EMFs of the print job according to the contents of the process information.

Upon receipt of the process command, the page separation unit 42 performs the same functions as the page separation unit 22 of the first embodiment. That is, the page separation unit 42 confirms the file names of the spool files 18, thereby identifying the print job that should be processed for the special printing. The page separation unit 42 then copies the EMFs for all the pages of the identified job into a temporary file (not shown in the drawings) that is prepared in the RAM 103 or other memory such as the hard disk 106. The temporary file will be erased once it is no longer needed. Then, the page separation unit 42 searches the "END" commands in the copied EMFs, and separates the EMFs for the respective pages from one another.

The Enhanced Meta File processor 43 is for performing processes on the separated Enhanced Meta Files, per se.

according to the contents of the process information included in the command file for the subject job.

It is now assumed that the Enhanced Meta Files for some print job has the configuration shown in FIG. 3 wherein the Enhanced Meta File (data file) for the first page has: a first command 1 and data for the first command 1, a second command 2 and data for the second command 2, a third command 3 and data for the third command 3, and an "END" command. In this case, the Enhanced Meta File processor 43 directly adds, to the Enhanced Meta File for each page, one or more sets of commands and data that are required for executing the designated special printing. For example, the Enhanced Meta File processor 43 processes the EMF for the first page by directly adding the one or more sets of commands and data in between the data for the third command 3 and the "END" command.

The page combining unit 44 is for preparing a new spool file by recombining the Enhanced Meta Files newly processed by the Enhanced Meta File processor 43 for all the pages. The thus combined Enhanced Meta Files are transferred to the spooler 16 as a new spool file 18. The combined Enhanced Meta Files of the new spool file are stored into the hard disk 106 by writing the newly-processed Enhanced Meta Files over the original spool file 18.

The job name of the newly-prepared spool file 18 is maintained the same as that of the original print job even though the content of the new spool file 18 is different from that of the original spool file 18. Accordingly, the job name to be managed by the printer control system will not change before and after the spool file has been processed. Therefore, the spooler 16 can write the new spool file 18 over the old spool file 18 so that the original print job will not be printed. Thus, the new spool file 18 is merely written over the old spool file 18.

The Enhanced Meta Files of the new spool file 18, which is thus written over the original spool file 18, is transferred to the code generator 29, whereupon the code generator 29 converts the Enhanced Meta Files of the new spool file 18 into control codes with description language corresponding to the particular model of the printer 30. Then, the resultant control codes are transmitted to the printer 30.

The spool file processor 40 of the present embodiment executes a spool file processing routine as shown in FIG. 16.

First, in S101, the process command unit 40a of the spool file processor 40 analyses a command file of a print job that is newly formed by the print data preparation unit 14 Based on this analysis, It is determined whether or not the command file of the subject print job has any process information. If no process information is found (S101:NO), then there is no need to process the Enhanced Meta Files for the subject print job, so this routine is ended. On the other hand, if process information is found (S101:YES), then in S102, a standby condition is entered until the spooler 16 completely spools out Enhanced Meta Files for all pages of the present print job. During the standby condition, it is repeatedly checked whether or not spooling is being performed.

Once EMFs for all the pages are spooled out into a spool file 18, the program proceeds to S103, where the page separation unit 42 identifies the subject print job that is now being completely stored in the spooler file 18. The page separation unit 42 then copies Enhanced Meta Files of the subject print job from the spool file 18 into a temporary file. Then, in S104, the copied Enhanced Meta Files for the respective pages are separated from one another.

Then in S105, processes are performed on each Enhanced Meta File through adding commands required for performing the designated special type of printing to each Enhanced Meta File. Next, in S106, the Enhanced Meta Files, which have been processed by pages, are recombined into a new spool file 18 by the page combining unit 44. The new spool file 18 is written over the original spool file 18. At this time, the process information relating to the special printing is deleted from the command file for the present job. Then, the spool file processing routine ends. When the new spool file 18 is again subjected to the process of FIG. 16, because the command file has no process information (no in S101), data of the spool file 18 will be sent to the code generator 29.

Processes performed on the Enhanced Meta Files in S105 for the designated special type of printing are different from those performed in S6 of the first embodiment in that the processes of S105 are executed to directly process the EMFs by adding necessary commands and data to the EMFs. This is contrary to the processes of S6 in the first embodiment, wherein EMFs are projected onto the device context and the EMFs are processed on the device context, thereby letting the GDI 25 automatically produce new EMFs representing the images processed on the device context.

The processes of S105 will be described below in greater detail with reference to the concrete examples of the special type of printing.

When the command file includes the process information for the multi-page printing, such as the 4-in-1 and 2-in-1 printing shown in FIGS. 5–6(b), then the processing routine of S105 are designed to first perform calculation processes similar to the processes of S11. That is, the EMF processor 43 first calculates how the image of each page should be converted in its position, size, and orientation through executing calculation processes in the similar manner as in the processes of FIGS. 8 and 9. Then, based on the calculated results, the EMF processor 43 adds, to the Enhanced Meta File for each page, a command for converting a coordinate of the image of the EMF, another command for changing a scale of the image of the EMF to reduce the size for printing, and still another command for setting an orientation in which the image of the EMF should be printed.

When the command file includes the process information for overlap printing shown in FIG. 10, the processing routine of S105 is designed to first perform the calculation process of S52 shown in FIG. 11. That is, the size and print position of the semitransparent characters to be printed are calculated based on: the print sheet size, the number of the semitransparent characters, and the print angle of the semitransparent characters on the print sheet. Then, processes are performed to add, to the EMF for the designated page, commands for printing data with the calculated character size and at the calculated character positions.

When the command file includes the process information for the page-exchange printing processes shown in FIG. 12, the spool file processing routine of S105 is designed to first perform the same processes as the processes of S71 and S72 shown in FIG. 13. Then, each Enhanced Meta File, thus retrieved in S72 in the page order calculated in S71, is appended with a command for instructing that the retrieved page should be printed in the thus retrieved order.

As described above, according to the present embodiment, the code generator 29 can generate control codes in description language corresponding to the printer model based on the Enhanced Meta Files of the newly-formed spool file 18 in the same manner as in the first embodiment. It becomes unnecessary for the code generator 29 to prestore special control codes for the special printing jobs in description language corresponding to each printer model. By performing the simple processes independent of the printer model, the personal computer 10 can control print jobs for the special types of printing.

In particular, according to the present embodiment, the Enhanced Meta Files themselves are processed by the EMF processor 43. Then, the processed Enhanced Meta Files are recombined into the new spool file 18. As a result, even though the managed file name does not change before and after the processing of the EMFs, a new spool file 18 with different contents from the original spool file 18 can be obtained. By writing the Enhanced Meta Files of the new spool file 18 over the Enhanced Meta Files of the original spool file 18, the user's designated special types of printing can be performed by using the new spool file 18 in the same manner as executing the original spool file.

While the invention has been described in detail with reference to specific embodiments thereof, it would be apparent to those skilled in the art that various changes and modifications may be made therein without departing from the spirit of the invention, the scope of which is defined by the attached claims.

For example, the above-described embodiments are directed to the cases where the spool file processing programs to be executed by the spool file processors 20 and 40 are stored in the hard disk 106 and where the spool file processing programs have been initially stored in another type of data recording medium, such as the flexible disk 120. The spool file processing programs can be initially stored in any other types of data recording mediums. The personal computer 10 can first retrieve the program from the data recording medium, and then process the Enhanced Meta Files using the retrieved program.

The representative examples of the special type printing not only include the above-described multi-page printing, overlap printing, and page-exchange printing, but also include other various types of special printing.

The operating system (OS) is not limited to the Windows NT (trade mark), but can be constructed from other programs.

In the above description, the program representing the function of the spool file processors 20 and 40 may be initially stored in the data storage medium 120 in a retrievable condition. However, a program representing the function of the print data preparation unit 14 may also be initially stored in the data storage medium 120 in a retrievable condition together with the program for the spool file processor.

What is claimed is:

1. An intermediate file processing device, comprising:
    a memory;
    intermediate file forming means for receiving a set of print data for a print job to be printed by a printer, for forming, for the print job, a set of intermediate data which includes a set of one or more intermediate file, independent of a device for treating the print job, based on the set of print data, and for storing the intermediate data set in the memory, each intermediate file representing a single page image to be printed by the printer onto a single sheet;
    process command means for analyzing the intermediate data set to judge whether the intermediate data set includes process information indicative of a predetermined type of printing, and for producing a command to attain the predetermined type of printing when the intermediate data set includes the process information indicative of the predetermined type of printing;
    page separation means for, in response to the command, recognizing the set of one or more intermediate file and for separating the one or more intermediate file from one another; and
    processing means for producing a set of one or more new intermediate file, which is independent of a device for treating the print job and which is for attaining the predetermined type of printing, based on the separated one or more intermediate file and based on the command.

2. An intermediate file processing device as claimed in claim 1, wherein the memory is constructed from a hard disk.

3. An intermediate file processing device as claimed in claim 1, wherein the memory is constructed from a RAM.

4. An intermediate file processing device as claimed in claim 1, further comprising code generating means for converting the set of one or more new intermediate file into code data appropriate for a type of the printer.

5. The intermediate file processing device as claimed in claim 1, further comprising print data preparation means for preparing the print data for each print job, the intermediate file forming means receiving the print data, and preparing the one or more intermediate file and a command file and storing the one or more intermediate file and the command file into the memory,
    wherein the process command means analyzes the command file stored in the memory to judge whether the command file includes the process information, and outputs the command when the command file includes the process information.

6. The intermediate file processing device as claimed in claim 5, wherein the processing means includes job preparation means for preparing a new print job based on the produced one or more new intermediate file.

7. The intermediate file processing device as claimed in claim 6, wherein when the process command means judges that the command file includes process information indicative of a predetermined multi-page printing, the process command means produces a command for performing the predetermined multi-page printing based on the judged result, and
    wherein the job preparation means prepares, in response to the multi-page printing command, a new print job for printing several images, represented by several intermediate files, within a single sheet.

8. The intermediate file processing device as claimed in claim 6, wherein when the process command means judges that the command file includes process information indicative of a predetermined overlap printing, the process command means produces a command for the predetermined overlap printing based on the judged result, and
    wherein the job preparation means prepares, in response to the overlap printing command, a new print job for printing a composite image that is comprised of a page image, represented by each of at least one intermediate file, and an overlap image to be formed with respect to the page image in an overlap condition.

9. The intermediate file processing device as claimed in claim 6, wherein when the process command means judges that the command file includes process information indicative of a predetermined page order changing printing, the process command means produces a command for the predetermined page order changing printing based on the judged result, and
    wherein the job preparation means prepares, in response to the page order changing printing command, a new print job for printing one or more pages represented by the one or more intermediate files in a changed page order.

10. The intermediate file processing device as claimed in claim 6, wherein the job preparation means includes:
   device context defining means for defining a device context as a virtual display region;
   output means for outputting: a command for setting print data of each intermediate file with respect to the device context; and another command for processing the print data on the device context in a processing operation corresponding to the predetermined type of printing; and
   preparation means for preparing the one or more new intermediate file based on the processing result produced on the device context based on the commands, thereby preparing the new print job.

11. An intermediate file processing device as claimed in claim 10, further comprising job erasing means for erasing the original print job.

12. The intermediate file processing device as claimed in claim 10, wherein when the process command means judges that the command file includes process information indicative of a predetermined multi-page printing, the process command means produces a command for performing the predetermined multi-page printing based on the judged result,
   wherein the output means outputs, in response to the multi-page printing command: a command for converting a position and a scale, at which each intermediate file is to be projected on the device context, so that several images represented by several intermediate files will be arranged within a single sheet; and another command for setting print data of each intermediate file on the device context according to the converted position and scale, and
   wherein the preparation means prepares a new print job based on the device context newly set with the print data.

13. The intermediate file processing device as claimed in claim 10, wherein when the process command means judges that the command file includes process information indicative of a predetermined overlap printing, the process command means produces a command for the predetermined overlap printing based on the judged result,
   wherein the output means outputs, in response to the overlap printing command: a command for setting print data of each of at least one intermediate file on the device context; another command for calculating a size and a position of an overlap image to be set on the device context in an overlap condition with respect to each of the at least one intermediate file; and still another command for setting, according to the calculated size and position, print data of the overlap image in the overlap condition with respect to the print data of the intermediate file already set on the device context, and
   wherein the preparation means prepares a new print job based on the device context newly set with the print data.

14. The intermediate file processing device as claimed in claim 10, wherein when the process command means judges that the command file includes process information indicative of a predetermined page order changing printing, the process command means produces a command for the predetermined page order changing printing based on the judged result, and
   wherein the output means outputs, in response to the page order changing printing command: a command for calculating a page order, in which one or more page image represented by the one or more intermediate file will be printed; another command for retrieving the one or more intermediate file from the memory in the calculated page order; and still another command for setting, on the device context, print data of the one or more intermediate file retrieved in the calculated page order, and
   wherein the preparation means prepares a new print job based on the device context newly set with print data.

15. The intermediate file processing device as claimed in claim 5, wherein the processing means includes:
   intermediate file processing means for processing the separated one or more intermediate file in a processing operation corresponding to the predetermined type of printing, to thereby produce the one or more new intermediate file; and
   page coupling means for preparing the set of one or more new intermediate file by coupling all the one or more new intermediate file.

16. The intermediate file processing device as claimed in claim 15, wherein the intermediate file processing means adds, to the one or more intermediate file, command data indicative of the processing operation corresponding to the predetermined type of printing operation, thereby processing the one or more intermediate file into the one or more new intermediate file.

17. The intermediate file processing device as claimed in claim 15, wherein the processing means further includes means for writing the set of one or more new intermediate file over the set of one or more intermediate file stored in the memory.

18. The intermediate file processing device as claimed in claim 15, wherein when the process command means judges that the command file includes process information indicative of a predetermined multi-page printing, the process command means produces a command for performing the predetermined multi-page printing based on the judged result, and
   wherein in response to the multi-page printing command, the intermediate file processing means adds, to each intermediate file: a command for converting a position of the page image represented by the intermediate file; another command for converting a scale of the page image represented by the intermediate file; and still another command for converting an orientation of the page image represented by the intermediate file.

19. The intermediate file processing device as claimed in claim 15, wherein when the process command means judges that the command file includes process information indicative of a predetermined overlap printing, the process command means produces a command for the predetermined overlap printing based on the judged result, and
   wherein in response to the overlap printing command, the intermediate file processing means calculates a size and position of an overlap image to be printed in an overlap condition with respect to a page image represented by each of at least one intermediate file, and adds, to each of the at least one intermediate file, a command for printing the overlap image, at the calculated size and position, in the overlapping condition with respect to the page image represented by the intermediate file.

20. The intermediate file processing device as claimed in claim 15, wherein when the process command means judges that the command file includes process information indicative of a predetermined page order changing printing, the process command means produces a command for the predetermined page order changing printing based on the judged result, and wherein in response to the page order changing printing command, the intermediate file processing means calculates a page order, in which one or more page image represented by the one or more intermediate files will be printed, retrieves the one or more intermediate files from the memory in the calculated page order, and adds, to each of the retrieved one or more intermediate file, a command for printing the page image of the intermediate file in the retrieved order.

21. An intermediate file processing device for a printer control system that uses a printer driver of a computer to convert, for a print job, print data, which is prepared by an application of the computer, into code data appropriate for the printer and that then provides the code data to the printer, the intermediate file processing device comprising:

a memory;

intermediate file forming means for receiving a set of print data for a print job to be printed by a printer, for forming a set of one or more intermediate file, independent of a device for treating the print job, for the print job based on the set of print data, and for storing the set of one or more intermediate file in the memory, each intermediate file representing a single page image to be printed by the printer onto a single sheet, the intermediate file forming means further forming a command file and storing the command file into the memory;

process command means for analyzing the command file stored in the memory, and producing, when the command file includes process information indicative of a predetermined type of printing, a command to attain the predetermined type of printing;

page separation means for, in response to the command, recognizing the set of one or more intermediate file for the print job and separating the one or more intermediate file from one another; and processing means for producing a set of one or more new intermediate file, which is independent of a device for treating the print job and which is for attaining the predetermined type of printing, based on the separated one or more intermediate file and based on the command, the set of one or more new intermediate file being converted by a printer driver into code data appropriate for the printer.

22. An intermediate file processing device as claimed in claim 21, wherein the memory is constructed from a hard disk.

23. An intermediate file processing device as claimed in claim 21, wherein the memory is constructed from a RAM.

24. The intermediate file processing device as claimed in claim 21, wherein the processing means includes:

device context defining means for defining a device context as a virtual display region;

print data setting means for setting the print data of each intermediate file with respect to the device context while processing the print data on the device context in the processing operation corresponding to the predetermined type of printing; and preparation means for preparing the one or more new intermediate file based on the processing result produced on the device context.

25. The intermediate file processing device as claimed in claim 21, wherein the processing means includes:

intermediate file processing means for processing the one or more intermediate file in the processing operation corresponding to the predetermined type of printing, to thereby produce the one or more new intermediate file; and page coupling means for preparing the set of one or more new intermediate file by coupling all the one or more new intermediate file.

26. A printer control system, comprising:

a printer; and a personal computer connected to the printer, the personal computer including:

a memory;

print data preparation means for preparing a set of print data for each print job to be printed by the printer;

intermediate file forming means for receiving the set of print data for each print job, for forming, for the print job, a set of one or more intermediate file, independent of a device for treating the print job, based on the set of print data, and for storing the set of one or more intermediate file in the memory, each intermediate file representing a single page image to be printed by the printer onto a single sheet, the intermediate file forming means further forming a command file and storing the command file into the memory;

process command means for analyzing the command file stored in the memory and for, when the command file includes process information indicative of a predetermined type of printing, producing a command to attain the predetermined type of printing operation;

page separation means for, in response to the command, recognizing the set of one or more intermediate file for the corresponding print job and for separating the one or more intermediate file from one another;

processing means for producing a set of one or more new intermediate file, which is independent of a device for treating the print job and which is for attaining the predetermined type of printing, based on the separated one or more intermediate file and based on the command; and code generating means for converting the set of one or more new intermediate file into code data appropriate for a type of the printer.

27. A printer control system as claimed in claim 26, wherein the memory is constructed from a hard disk.

28. A printer control system as claimed in claim 26, wherein the memory is constructed from a RAM.

29. The printer control system as claimed in claim 26, wherein the processing means stores the set of one or more new intermediate file in the memory as a new print job.

30. The printer control system as claimed in claim 26, wherein the processing means stores the set of one or more new intermediate file in the memory as the same print job through writing the set of one or more new intermediate file onto the set of one or more original intermediate file.

31. A data recording medium storing, in a retrievable condition, a control program for controlling an intermediate file processing device for a printer control system, the control program comprising:

a control program for analyzing one set of intermediate data for a print job, the intermediate data set including one set of one or more intermediate file indicative of one or more page image, the set of one or more intermediate file being independent of a device for treating the print job, for judging whether the intermediate data set includes process information indicative of a predetermined type of printing, and for producing, when the intermediate data set includes the process information indicative of the predetermined type of printing, a command to attain the predetermined type of printing;

a control program for, in response to the command, recognizing the set of one or more intermediate file and for separating the one or more intermediate file from one another; and a control program for producing, a set of one or more new intermediate file, which is independent of a device for treating the print job and which is for attaining the predetermined type of printing, based on the separated one or more intermediate file and based on the command.

32. The data recording medium as claimed in claim 31, wherein the control program further includes:

a control program for receiving a set of print data for the print job to be printed by a printer, for forming, for the print job, the set of one or more intermediate file based on the set of print data, and for storing the set of one or more intermediate file in a memory, each intermediate file representing a single page image to be printed by the printer onto a single sheet, the control program further forming a command file and storing the command file into the memory, and wherein the command producing control program analyzes the command file stored in the memory, and produces, when the command file includes the process information indicative of the predetermined type of printing, the command to attain the predetermined type of printing operation.

33. The data recording medium as claimed in claim 31, further comprising a control program for converting the set of one or more new intermediate file into code data appropriate for the printer.

* * * * *